United States Patent [19]

Bates et al.

[11] Patent Number: 5,377,317
[45] Date of Patent: Dec. 27, 1994

[54] METHOD AND APPARATUS FOR DISTINCTIVELY DISPLAYING WINDOWS ON A COMPUTER DISPLAY SCREEN

[75] Inventors: Cary L. Bates, Rochester; Jeffrey M. Ryan, Byron, both of Minn.

[73] Assignee: International Business Machines Corporation, Armonk, N.Y.

[21] Appl. No.: 811,562

[22] Filed: Dec. 20, 1991

[51] Int. Cl.$^5$ .............................................. G06F 3/14
[52] U.S. Cl. .................................... 395/157; 395/159; 395/161
[58] Field of Search ............... 395/157, 161, 155, 159; 340/715

[56] References Cited

U.S. PATENT DOCUMENTS

| | | | |
|---|---|---|---|
| 4,819,189 | 4/1989 | Kikuchi et al. | 364/521 |
| 5,060,170 | 10/1991 | Bourgeois et al. | 395/157 |

FOREIGN PATENT DOCUMENTS

| | | | |
|---|---|---|---|
| 0349459 | 5/1989 | European Pat. Off. | G06F 9/46 |
| 3618256 | 5/1986 | Germany . | |
| 1267725 | 4/1988 | Japan | 395/157 |

OTHER PUBLICATIONS

Microsoft Windows User's Guide (Trademark of Microsoft Corporation), 1990, pp. x, 84–85.
Algorithm for Optimum Window Positioning, IBM Technical Disclosure Bulletin, vol. 32, No. 8B, Jan. 1990, pp. 311–312, D. W. Dickson.

*Primary Examiner*—Heather R. Herndon
*Assistant Examiner*—Cliff N. Vo
*Attorney, Agent, or Firm*—Curtis G. Rose; Andrew J. Dillon

[57] ABSTRACT

A method and apparatus for aiding a user in identifying particular windows on a display screen. The amount of time each of the windows presented to the display screen is active (also known as "in focus") is monitored. Upon receipt of a command from the user, the windows that were active a longer length of time are displayed more distinctively than windows that were active a shorter length of time. Active windows can be displayed more distinctively in many different ways. One such way is by placing the most active window in the upper left corner of the screen and placing the rest of the windows in a descending order of activity from left to right and top to bottom on the screen. Another way is to cascade the windows, where the windows are cascaded in a descending order of activity from the front to the back of the window stack. Yet another way is to generate a list of window titles associated with each window, in a descending order of activity from the top of the list to the bottom of the list. Still another way of distinctively displaying more active windows is to put the most active window in focus, and then put the remainder of the windows in focus in descending order of activity in a toggle sequence of windows.

20 Claims, 25 Drawing Sheets

|  | TurboTax | Quicken | Excel |
|---|---|---|---|
|  | Word Perfect MY.T | Lotus 1-2-3 | File Manager |

FIG. 2B

| Control Data | 30 |
|---|---|
| 31—ON/OFF Flag | ON |
| 32—Timer | 000000673 |
| 33—Sampling Rate | 2 |
| 34—Suspend | FALSE |
| 35—Current Toggle Index | 120 |
| 36—Last Event | 671 |
| 37—Inactivity Timeout | 5 |
| 38—Save | ON |

FIG. 3A

| Window Data 40 | | |
|---|---|---|
| 41 Window Title | 42 In Focus | 43 Total |
| Word Perfect MY.TXT | 600 | 98 |
| File Manager | 10 | 40 |
| Lotus 1-2-3 | 655 | 84 |
| Quicken | 444 | 186 |
| Excel | 337 | 125 |
| Turbo Tax | 552 | 246 |

FIG. 3B

| Window Timing Function Parameters | | | |
|---|---|---|---|
| Window Timing Function | X ON | | OFF |
| Sampling Rate | 30 | seconds | |
| Inactivity Timeout | 5 | minutes | |
| Suspend Timing? | | YES | X NO |
| Save Window Function Data? | X YES | | NO |
| Reset Window Timing? | | YES | X NO |

FIG. 4

METHOD AND APPARATUS FOR DISTINCTIVELY DISPLAYING WINDOWS ON A COMPUTER DISPLAY SCREEN

FIELD OF THE INVENTION

This invention relates to the data processing field. More particularly, this invention relates to the representation of windows on a computer display screen.

CROSS REFERENCE TO RELATED APPLICATIONS

Co-pending U. S. patent application entitled "Method and Apparatus for Proportionally Displaying Windows on a Computer Display Screen", Ser. No. 07/811548 pending, commonly assigned and filed on even date herewith is related to this patent application and is hereby incorporated by reference.

BACKGROUND OF THE INVENTION

Computer systems that use what is known as a "graphical user interface", first introduced to the market by Apple, and later adopted by Microsoft with its "Windows" program, and by IBM with OS/2 and Presentation Manager, are a fairly recent addition to the state of the art. One common feature of these graphical user interface systems is that a multitude of windows or viewports can be present simultaneously on the computer display screen. Different application programs can be running (or waiting for input from the user) concurrently in each of the windows displayed on the computer display screen. In addition, a single application program can generate many different windows. The user can use a mouse or other input device to move back and forth between different windows, thereby performing many different tasks.

While these graphical user interface systems offer many advantages over more conventional operating systems such as DOS (which can only run and display one application program at a time), this additional function has created new problems for the user. While graphical user interface systems offer the capability of presenting a nearly unlimited number of windows on a computer screen, this does not mean that these nearly unlimited number of windows can be displayed on a computer screen so they can be seen by a user. In fact, it is quite probable that the vast majority of these windows will be either partially or completely obscured by other windows. This problem can occur with as little as two windows, but is exasperated when many more windows than this are used.

When some of the windows are partially or completely obscured, it becomes very difficult for the user to successfully move back and forth between the various windows, since the user is unable to find many of them without a significant amount of effort. This limitation in graphical user interface systems tends to defeat the very purpose of having such a system by severely restricting the number of different tasks or application programs that can really be used concurrently and displayed or otherwise presented simultaneously via windows.

SUMMARY OF THE INVENTION

It is a principle object of the invention to enhance the operation of a graphical user interface system.

It is another object of the invention to provide a more efficient way for users to find partially or completely obscured windows.

It is another object of the invention to distinctively display windows on a computer display screen to assist users in finding partially or completely obscured windows.

These and other objects are accomplished by the method and apparatus for distinctively displaying windows on a computer display screen disclosed herein.

A method and apparatus for distinctively displaying windows on a computer display screen is disclosed. The amount of time each of the windows presented to the display screen is active (also known as "in focus") is monitored. Upon receipt of a command from the user, the windows that were active a longer length of time are displayed more distinctively than windows that were active a shorter length of time. Active windows can be displayed more distinctively in many different ways. One such way is by placing the most active window in the upper left corner of the screen and placing the rest of the windows in a descending order of activity from left to right and top to bottom on the screen. Another way is to cascade the windows, where the windows are cascaded in a descending order of activity from the front to the back of the window stack. Yet another way is to generate a list of window titles associated with each window, in a descending order of activity from the top of the list to the bottom of the list. Still another way of distinctively displaying more active windows is to put the most active window in focus, and then put the remainder of the windows in focus in descending order of activity in a toggle sequence of windows.

BRIEF DESCRIPTION OF THE DRAWING

Figs. 2B-2E (1-6) show the different ways more active windows can be distinctively displayed.

FIG. 3A shows the control data of the invention.

FIG. 3B shows the window data of the invention.

FIG. 4 shows an exemplary screen used to set user modifiable parameters of the invention.

DESCRIPTION OF THE PREFERRED EMBODIMENT

Figure 1:
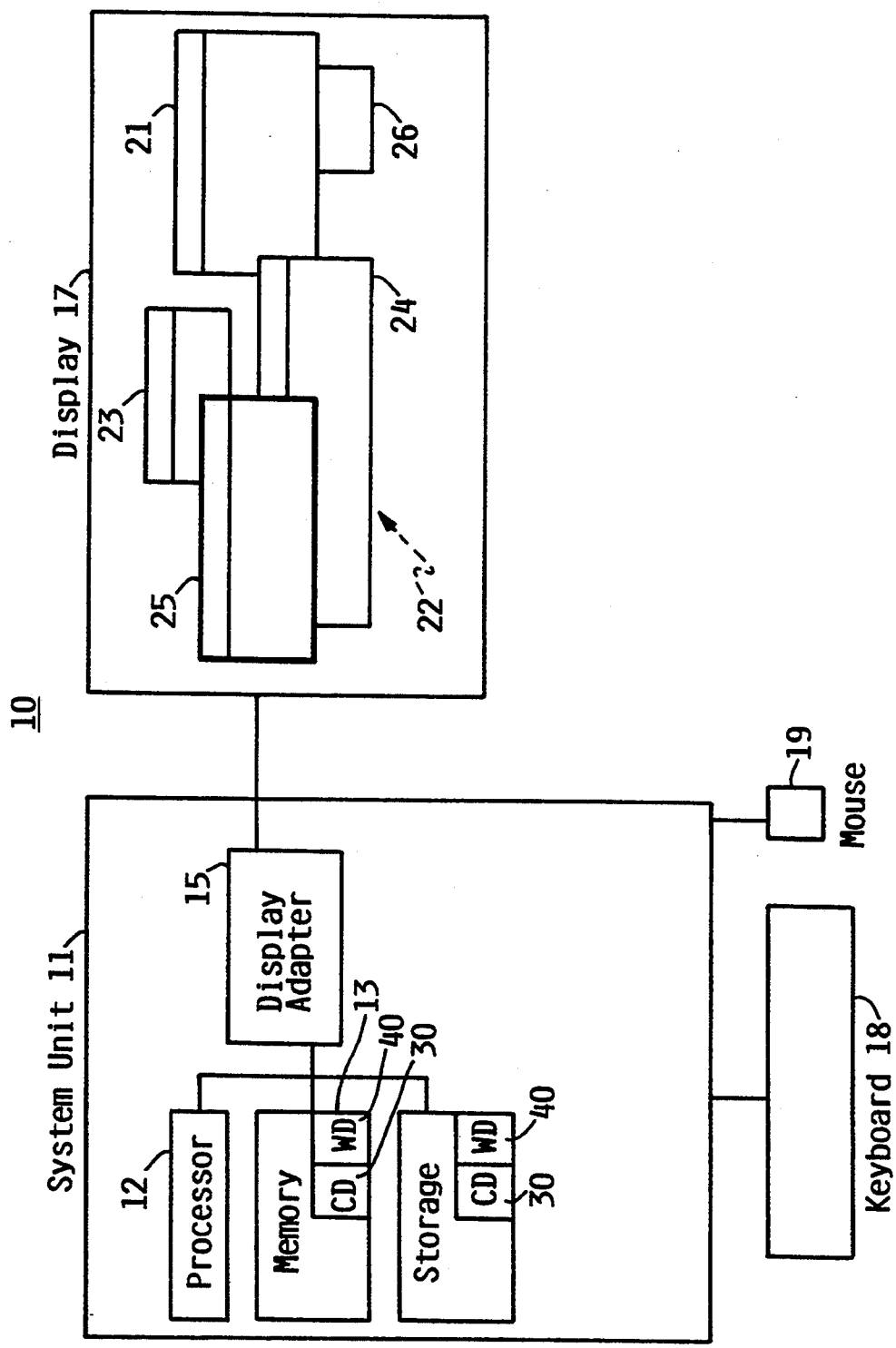
FIG. 1 shows a block diagram of the computer system of the invention.

FIG. 1 shows a block diagram of computer system 10 of the invention. Computer system 10 has display 17, keyboard 18, and input device 19, each of which is connected to system unit 11. System unit 11 contains processor 12 connected to memory 13, storage 14, and display adapter 15. Processor 12 is suitably programmed to carry out this invention, as described in more detail in the flowcharts of FIGS. 5-10. Storage 14 and memory 13 contains control data 30 and window data 40.

In the preferred embodiment, computer system 10 is an IBM PS/2, where processor 12 is an Intel 80386 microprocessor. Display adapter 15 is an IBM 8513 display adapter, and display 17 is an IBM 8513 display. Input device 19 is preferably an IBM mouse but may also be a track ball, light pen, or other input device.

Disk 14 contains operating system software, preferably OS/2 with Presentation Manager but optionally Microsoft Windows 3.0, as well as preferably one or more OS/2 application programs such as WordPerfect for Presentation Manager or optionally DOS application programs such as Microsoft Word for Windows. When running, these programs are partially or completely installed in memory 13 and executed by processor 12.

Computer system 10 could also be another type of computer system, whether it be another microcomputer such as an Apple Macintosh, a minicomputer such as an IBM AS/400, or a mainframe computer such as an IBM 390, and still fall within the spirit and scope of this invention. In addition, computer system 10 can be a microcomputer such as described above, connected to a larger computer system such as an IBM AS/400.

Display 17 contains windows 21-26. For the purposes of this invention, a "window" or viewport can occupy anywhere from substantially all of the display screen to a very small portion of the display screen, and may be displayed in conjunction with other windows in a multi-tasking environment such as OS/2 or in a single-tasking environment such as DOS. As the number of windows increases, it becomes more likely that many windows will become partially or completely obscured by other windows, as is shown in display 17 of FIG. 1.

Figure 2A:
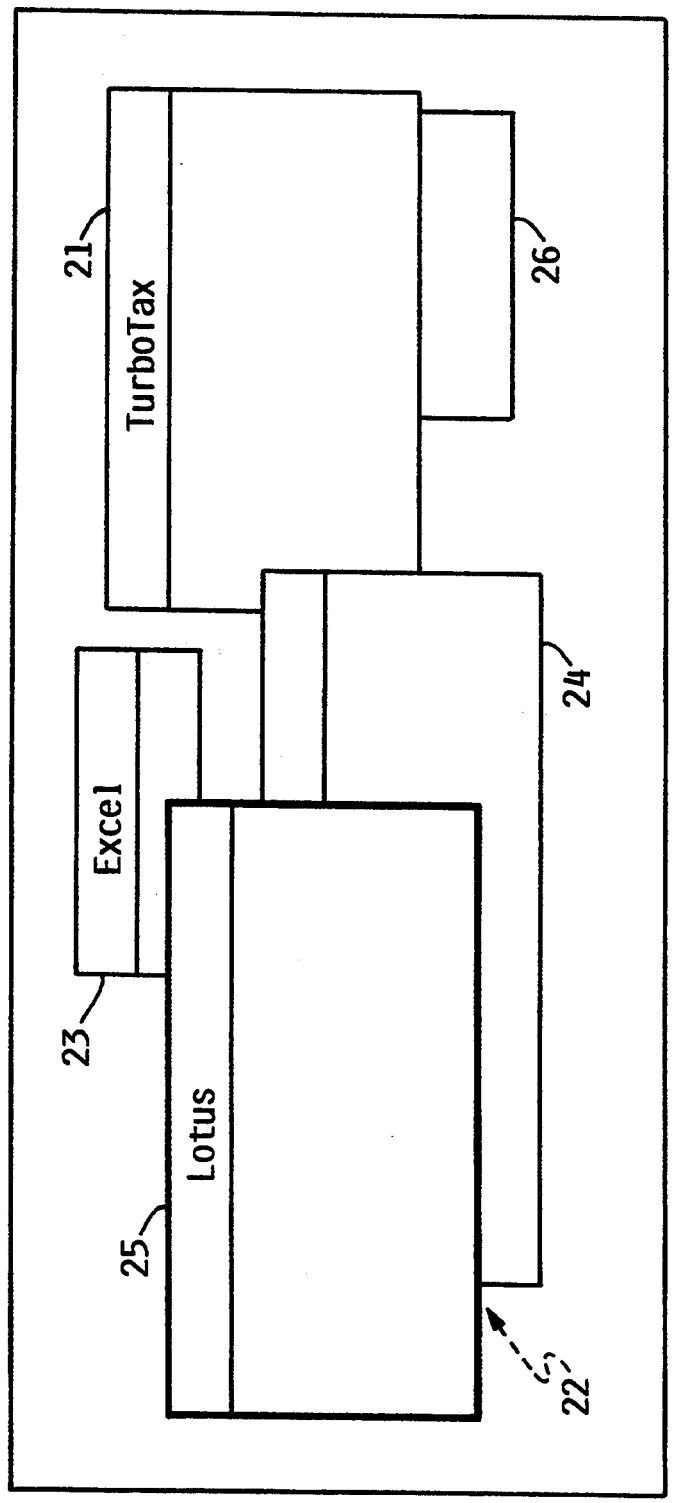
FIG. 2A shows how windows are displayed after a user has performed tasks on their computer for several minutes or hours.

FIG. 2A shows windows 21-26 on display 17 of FIG. 1 in more detail. FIG. 2A is exemplary of how a typical display screen might look after a user has performed tasks on their computer for several minutes or hours. Specifically, our user is using her computer to do some end of the year tax planning. While six windows are shown, anywhere from one to dozens of windows can be presented on a display screen. Note that window 25 has a darker border than the remainder of the windows and is not overlapped by any other window. This indicates to the user that window 25 is the active window, or is considered to be "in focus". When a window is "in focus", the user can input or otherwise manipulate the data contained in that window.

Windows 21, 22, 23, 24, and 26 are at least partially obscured by other windows. Window 22 is completely obscured. Windows 24 and 26 are almost completely obscured—little if any data contained in these windows is displayed to the user.

Our fictitious user, Tammy Taxpayer, started bright and early on a Saturday morning just before Christmas (she had finished her Christmas shopping in August) to do her end of the year tax planning. Tammy uses several application programs concurrently to help her with her tax planning. Tammy has spreadsheet data on Excel and Lotus, composes letters to the IRS and memos to her accountant on WordPerfect, has her financial information on Quicken, and enters in her tax data on TurboTax. She also is using an OS/2 application program known as File Manager, which assists Tammy in managing directories and other aspects of files on OS/2.

Tammy has jumped all around from window to window—a feature she particularly likes about Presentation Manager—and has most recently spent some time manipulating data in window 25 (i.e. using a spreadsheet on Lotus 1-2-3). But now Tammy wants to go back to the program she has used much of the morning—Quicken. Tammy quickly scans the display, only to discover that it is not readily apparent where the window that contains Quicken is!She can see enough of windows 21, 23, and 25 to know that these windows do not contain Quicken. But Quicken could be in either partially obscured windows 24 or 26, or in completely obscured window 22. Tammy could use trial and error and look in each window (by moving the mouse pointer over to the obscured window and clicking a mouse button to make the window active), but this technique is quite cumbersome and does not work when there are many windows on the screen, or when one or more windows are completely obscured.

Fortunately for Tammy, her computer system is computer system 10 of this invention. Therefore, she has the ability to rapidly find her Quicken window using one of several window display modes of this invention by pressing one of several predefined keys or key sequences, a combination of mouse button sequences, or by selecting an item on a menu screen. As will be discussed in more detail later, processor 12 of computer system 10, suitably programmed to execute the flowcharts of FIGS. 5-10, monitors the amount of time each of the windows presented to the display screen is active, or "in focus". When Tammy selects a window display mode, the windows that were in focus a longer length of time are displayed more distinctively than windows that were in focus a shorter length of time. The actual manner in which active windows are displayed more distinctively is dependent on the window display mode selected.

If Tammy selects the key sequence for the window display mode, known as the "left to right" mode, display screen 17 appears as is shown in FIG. 2B. Computer system 10 has been monitoring Tammy's activity since she started using the computer today, and knows that her windows have been used in the following order of activity, from most to least: TurboTax, Quicken, Excel, Word Perfect, Lotus, and File Manager. Therefore, when Tammy selects the left to right window display mode, TurboTax is placed in the upper left hand corner of the display screen, followed by Quicken and Excel. Word Perfect, Lotus and File Manager are placed on the screen left to right in a second row under TurboTax, Quicken and Excel. Now Tammy can quickly find Quicken, since it is not obstructed and is in the second most distinctive position on the screen. She can now move her mouse cursor over to the Quicken window, put it in focus, enlarge it if necessary, and begin working with it.

While English speaking cultures would consider the left to right/top to bottom organization of windows as shown in FIG. 2B to be an optimal way of organizing windows in the order of desired distinctiveness, other cultures may prefer other organizations, such as right to left/top to bottom, top to bottom/left to right, or top to bottom/right to left. As will be seen later, the preferred embodiment can be modified slightly to accommodate these cultural or personal differences.

Figure 2C:
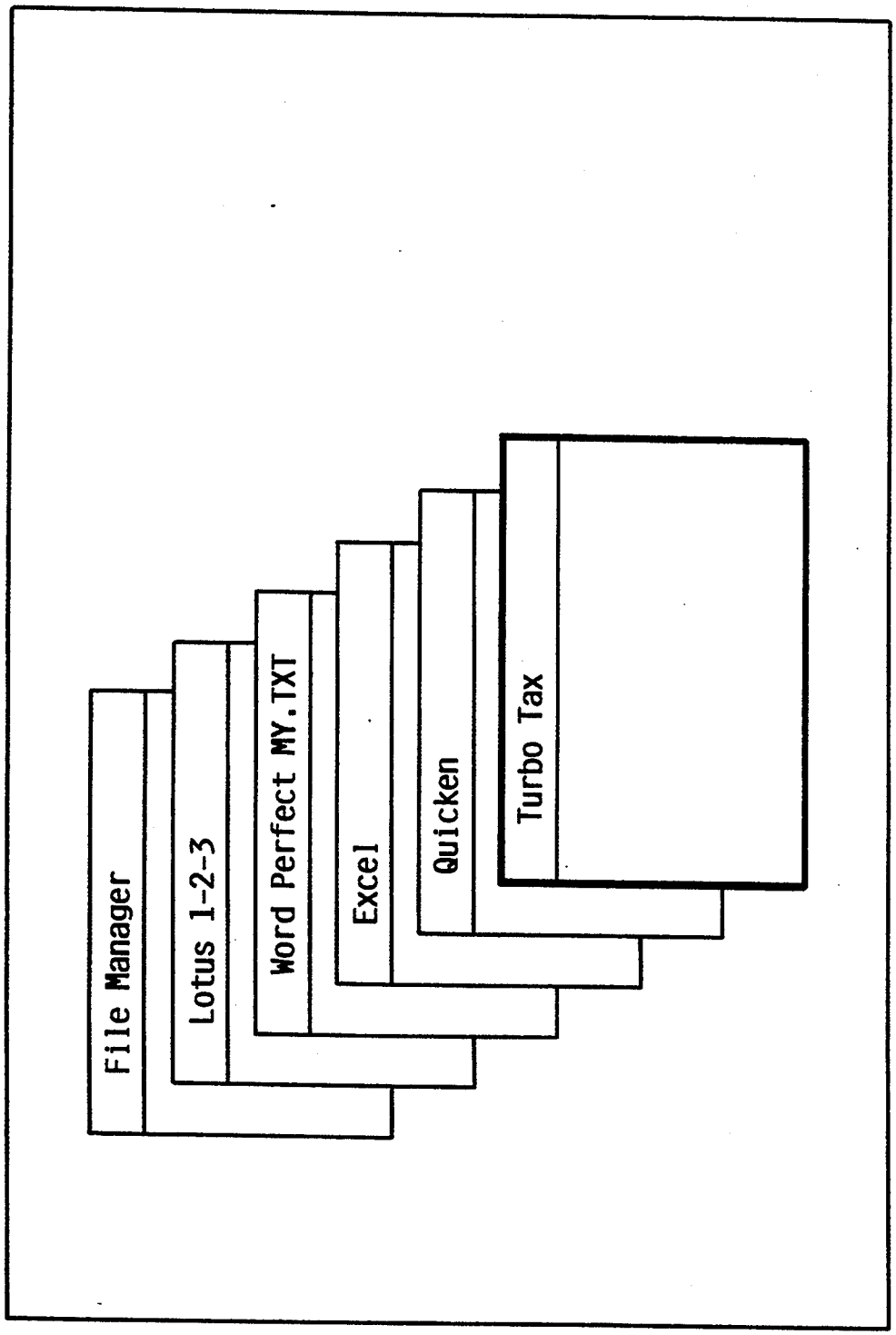

If Tammy selects the key sequence for the window display mode, known as the "cascade" mode, display screen 17 appears as is shown in FIG. 2C. As before, computer system 10 has been monitoring Tammy's activity since she started using the computer today, and knows that her windows have been used in the following order of activity, from most to least: TurboTax, Quicken, Excel, Word Perfect, Lotus, and File Manager. Therefore, when Tammy selects the cascade window display mode, TurboTax is placed in the most distinctive position at the top of the stack of windows, followed by Quicken, Excel, Word Perfect, Lotus, and File Manager. Note that only TurboTax is unobstructed. The remainder of the windows have their titles visible but have the rest of the window obstructed. Still, being able to see the title to all the windows is usually sufficient to enable a user to quickly find the window they are looking for, especially if they are arranged in order of activity.

Figure 2D:
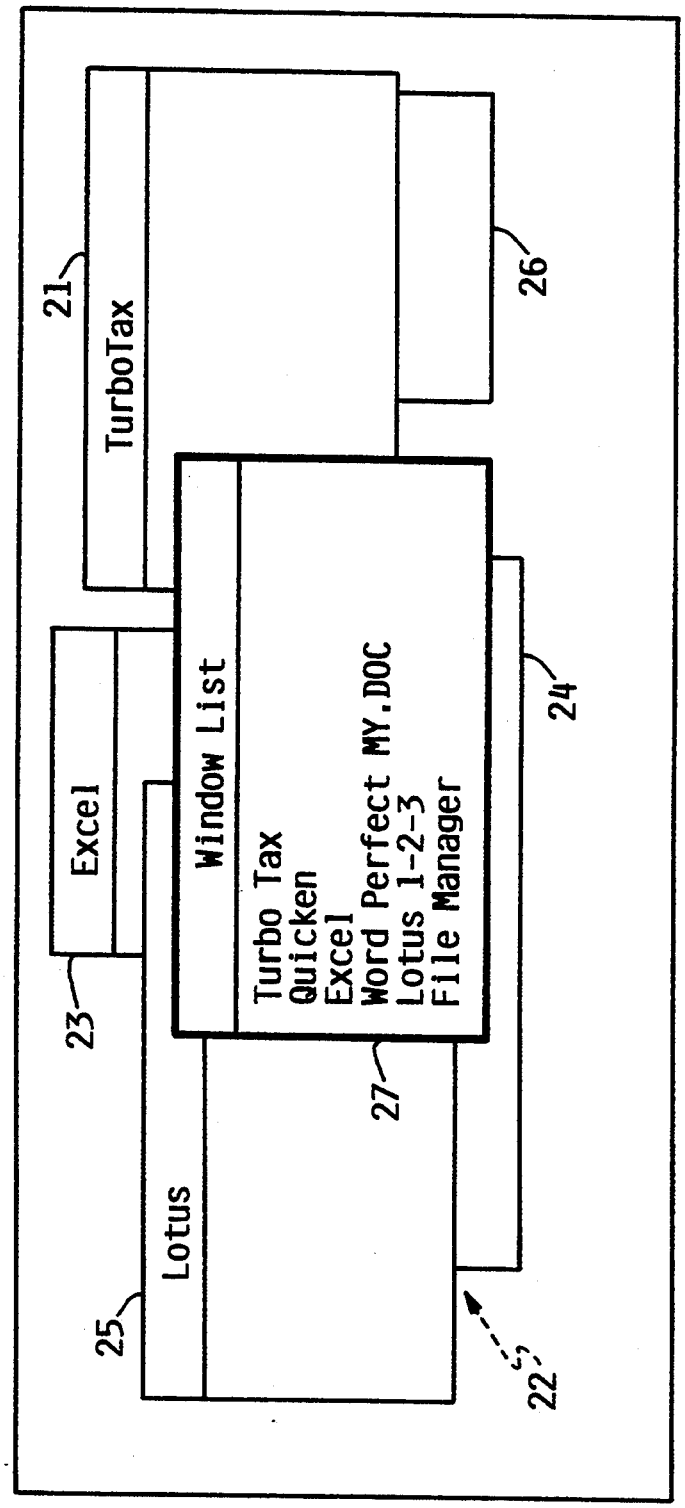

If Tammy selects the key sequence for the window display mode, known as the "window list" mode, display screen 17 appears as is shown in FIG. 2D. This mode displays a new window that contains the titles of all windows currently presented (whether visible to the user or not) to the display. The titles on the window list are ordered from most active at the top to least active at the bottom. In our example, Tammy can move her mouse cursor over to the title "QUICKEN" and click the mouse button to bring the Quicken window to the foreground and puts it in focus so she can use it.

If Tammy repeatedly selects the key sequence for the window display mode, known as the "toggle" mode, display screen 17 appears as is shown in FIGS. 2E-1 to 2E-6. The first time the toggle key sequence is selected, the most active window (in our case, TurboTax) pops to the foreground and becomes in focus. When the toggle key sequence is again pressed, the second most active window (Quicken) pops to the foreground and becomes in focus. Since this is the window that Tammy was looking for, she would probably stop pressing the toggle key sequence and instead start working with Quicken; however, she could continue pressing the toggle key sequence and put the remaining windows in focus in order of their activity. If the toggle key sequence is pressed after the least active window has been put in focus, this window display mode loops back to the most active window and puts it back in focus.

FIG. 3A shows control data 30 of FIG. 1 in more detail. In the preferred embodiment, control data 30 is stored in storage 14 and read into memory 13, as will be discussed later. Control data 30 contains information used and updated by the flowcharts of FIGS. 5-10 to perform the window timing function of the invention.

ON/OFF flag 31 keeps track of whether the window timing function of the invention is on or off. Timer 32 keeps track of the value of the current system timer. In the preferred embodiment, timer 32 is a nine digit value that expresses the number of time periods (as determined by sampling rate 33) that have elapsed since the timer was started or reset. Suspend flag 34 keeps track of whether the window timing function has been suspended, as will be discussed in more detail later. Current toggle index flag 35 is used in the window toggle mode shown in FIG. 2E. Last event flag 36 is used to monitor the user's activity. This data is used to check for a situation where a window is in focus for a long period of time but there is no activity coming from the user (i.e. coffee break, etc) and to automatically suspend the window timing function when a specified inactivity timeout period has elapsed. Inactivity timeout flag 37 contains the specified inactivity timeout period. Save flag 38 keeps track of whether the user wants window data 40 to be saved.

FIG. 3B shows window data 40 of FIG. 1 in more detail. In the preferred embodiment, window data 40 is stored in storage 14 at the option of the user and read into memory 13, as will be discussed later. Window data 40 contains information used and updated by the flowcharts of FIGS. 5-10 to perform the window timing function of the invention. Window data 40 is arranged in columns 41-43. Each window that has been active at some point of time when the window timing function of the invention has been on is contained in window data 40 in memory 13. Column 41 contains the title or other identifier of these windows. Column 42 contains the value of timer 32 the last time that each of the windows was put in focus. Column 43 contains the total number of time periods that each of the windows in window data 40 have been in focus.

Figures 1, 2E:
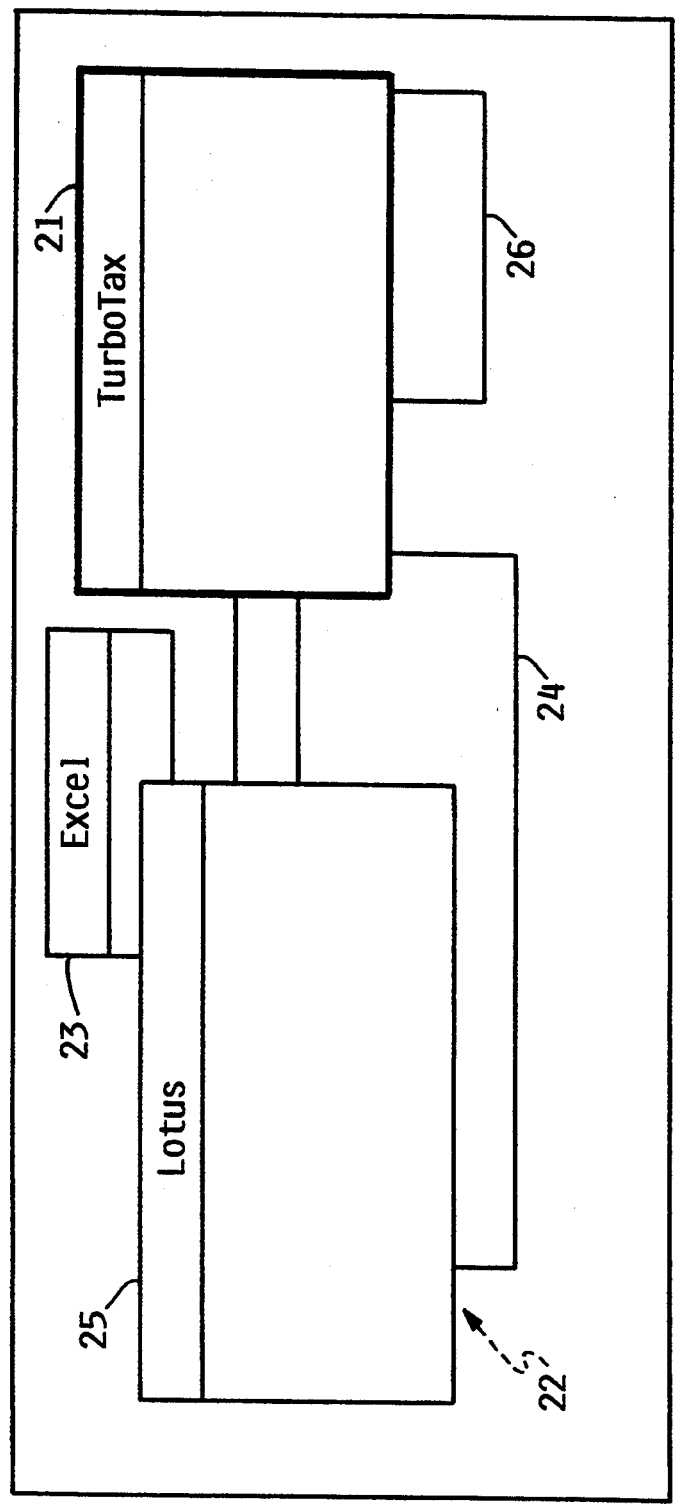
Figures 2, 2E:
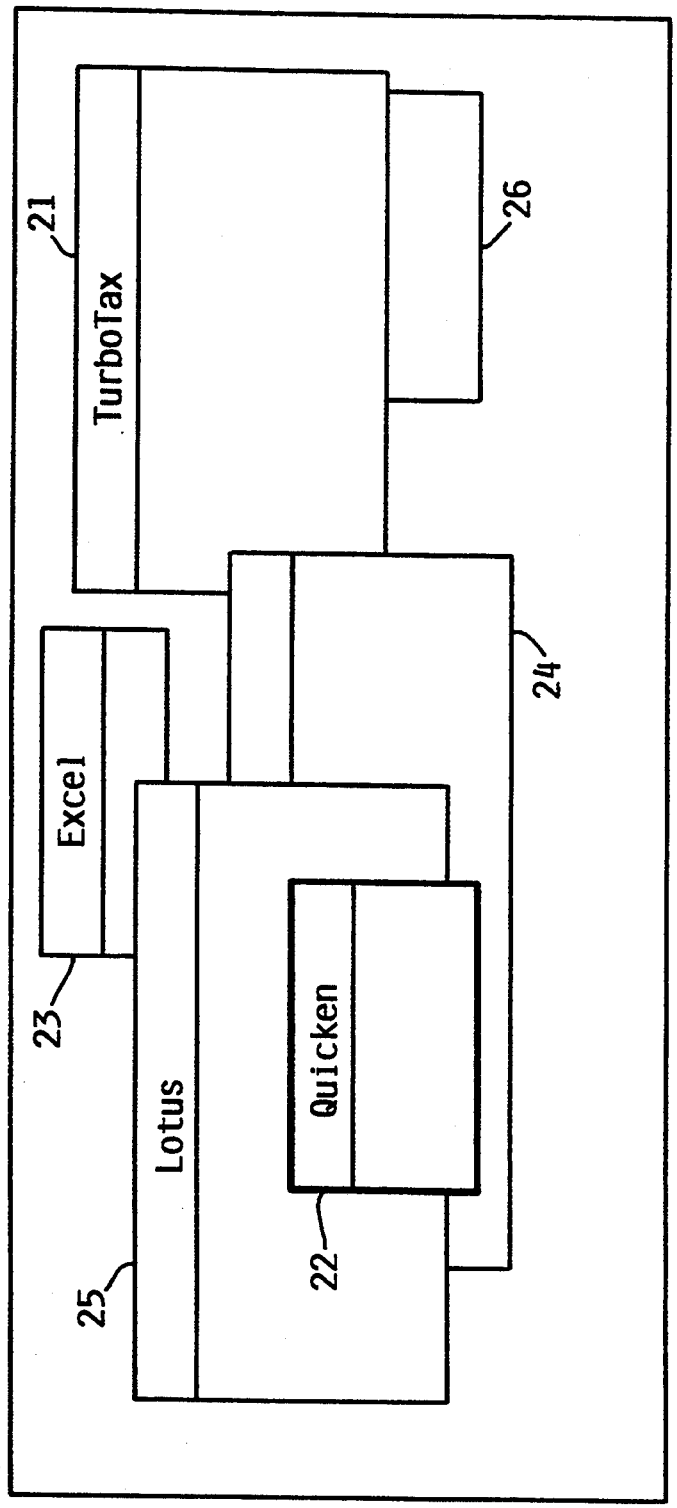
Figures 2, 2E, 3:
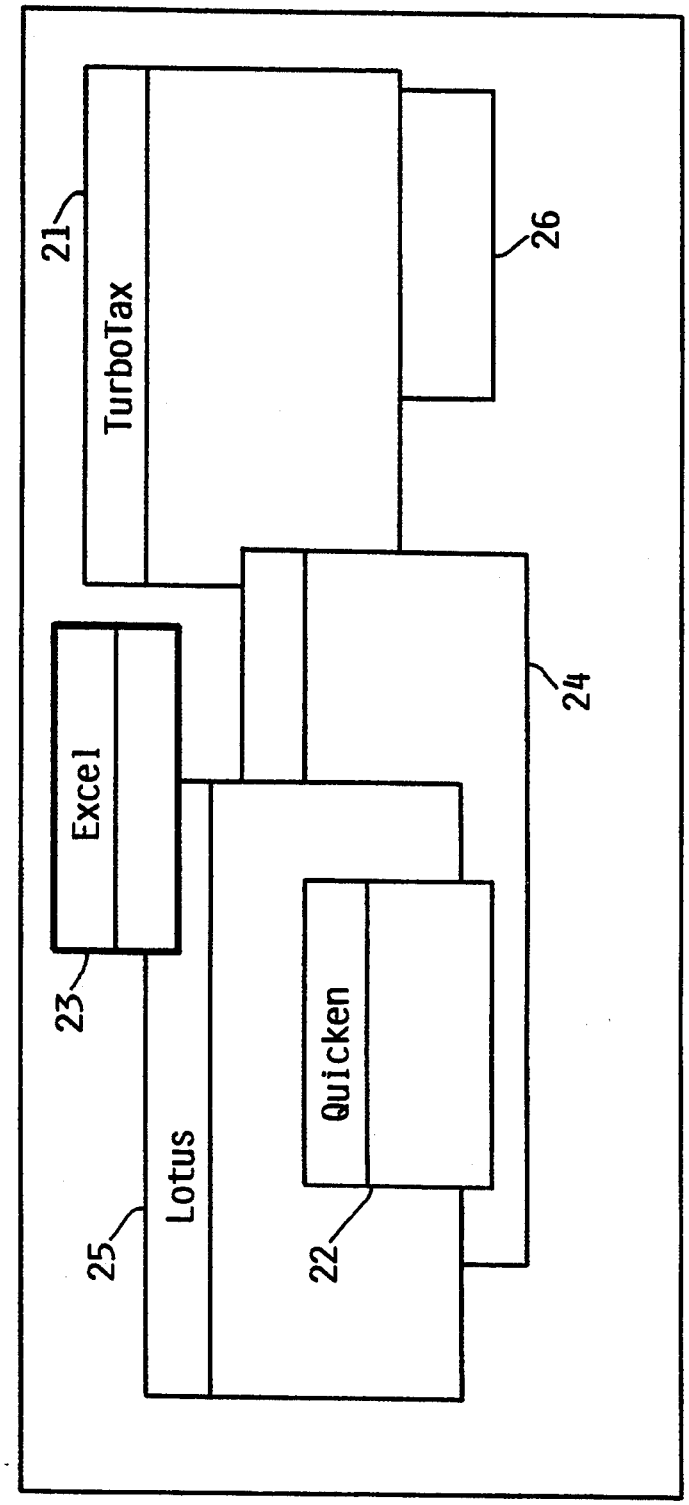
Figures 2, 2E, 3, 4:
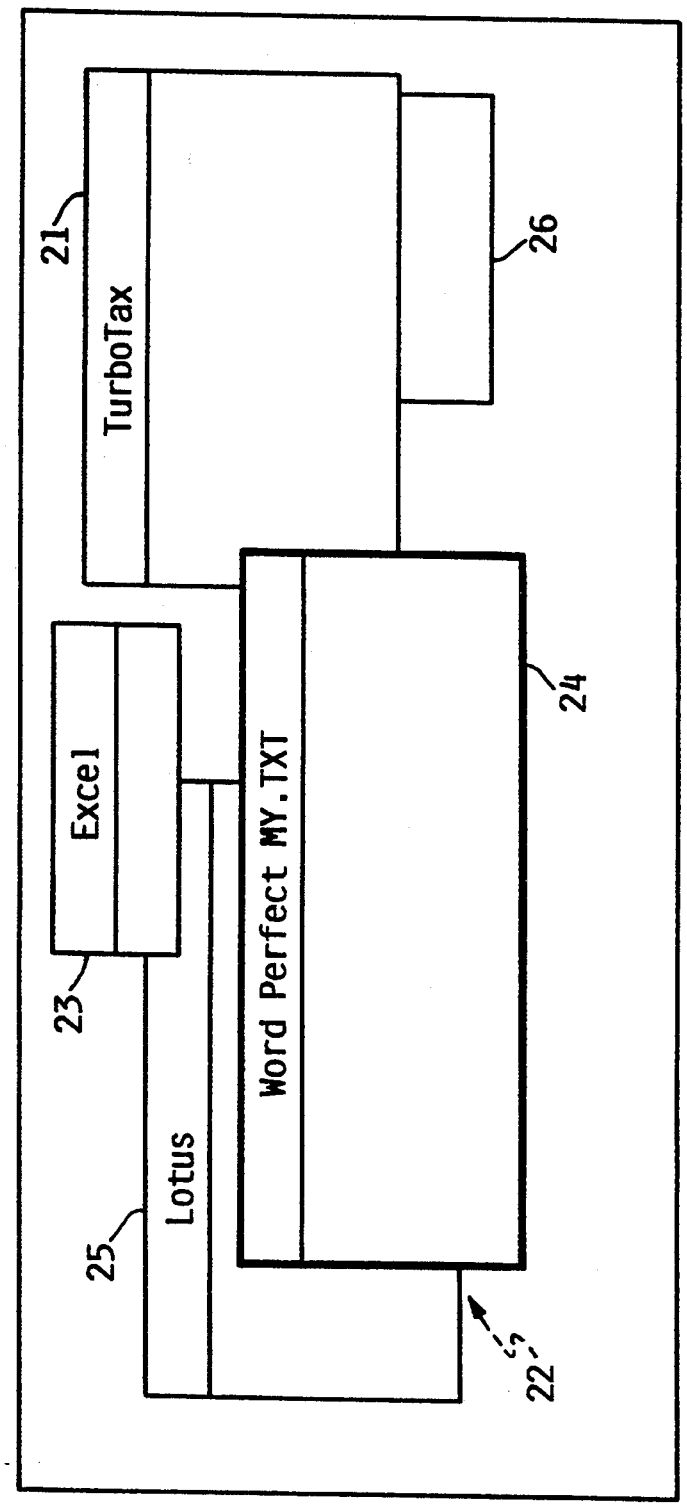

FIG. 4 shows the window timing function. parameters. These parameters are normally assigned default values, but can be presented to the user upon demand for possible modifications. The first parameter asks whether the window timing function should be on or off. There may be instances where the user would prefer that the windows operate in a more conventional fashion. The next parameter is the sampling rate. This allows the user to control the level of granularity of the window timing function.

The next parameter specifies the inactivity timeout period. The next parameter asks if a user wants to suspend window timing. This parameter can be selected via the screen shown in FIG. 4, or a special key sequence can be set up to toggle this parameter on or off. This parameter could be quite useful to minimize the effects of bathroom breaks or other interruptions. The next parameter asks if window data 40 created during this computing session should be saved for the next computing session. If so, window data 40 is written from memory 13 to storage 14 as a window is closed. The last parameter asks whether window timing should be reset. It may be desirable to "start over" in the middle of a computing session, especially if the user is now performing a completely unrelated task to what was done previously. If the user specifies that the window timing should be reset, all windows start fresh as if they have not been activated during this session.

Figures 2, 2E, 3, 4, 5:
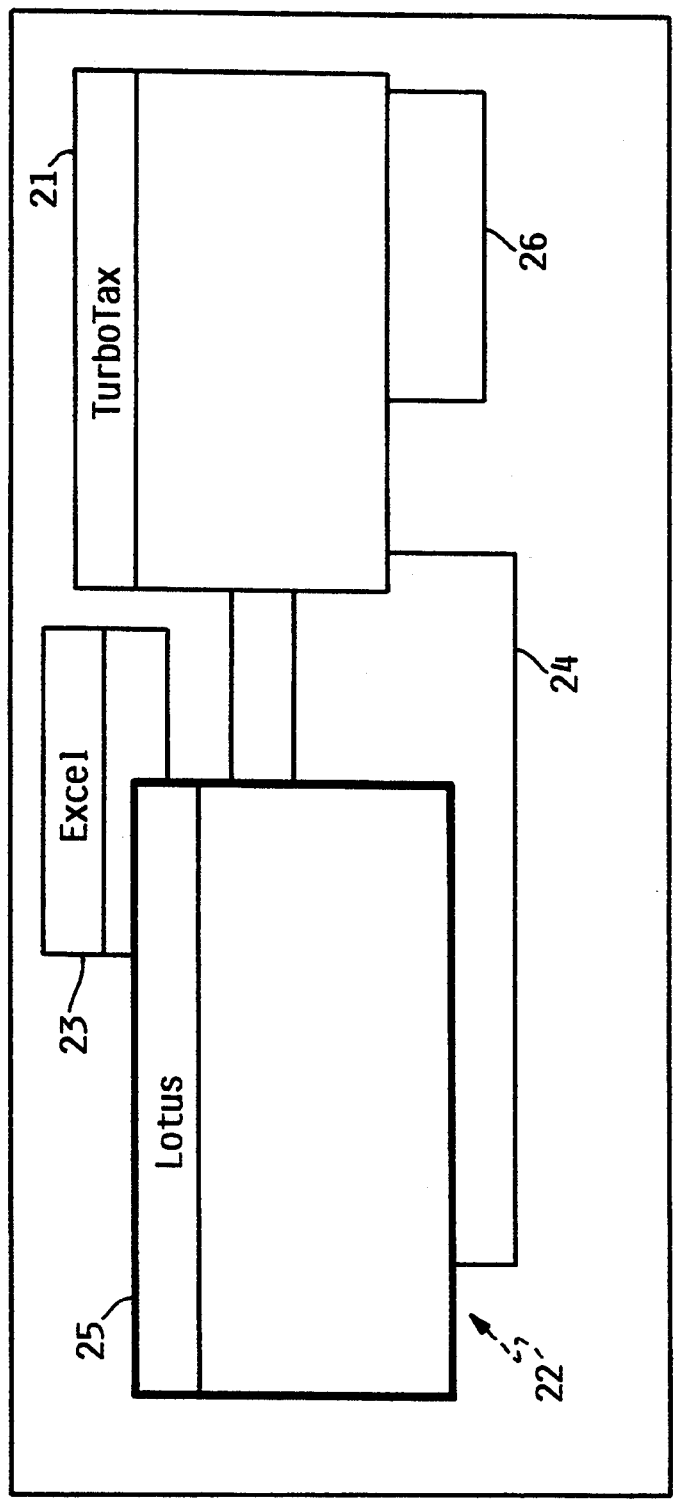
Figure 7:
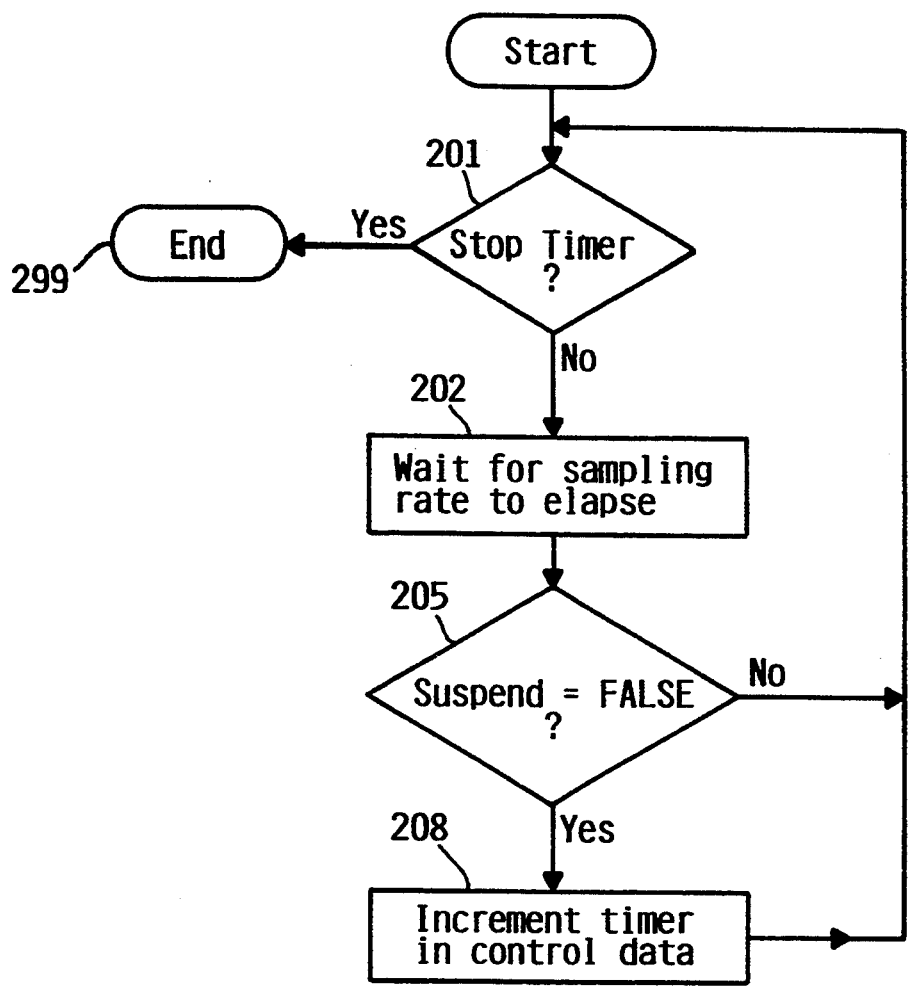

The operation of this invention, as shown in the flowcharts of FIGS. 5-10, will now be described in more detail. Referring now to FIG. 5, block 101 loads control data 30 from storage 14 to memory 13. Block 102 initializes timer 32, current toggle index flag 35, and last event flag 36 in control data 30. Block 103 starts timer 32. This is done by initiating the execution of the flow chart of FIG. 7. Referring now to FIG. 7, block 201 asks if it has received any indication to stop the timer from block 198 of FIG. 5A. If so, the program ends in block 299. If not, block 202 waits for sampling rate 33 in control data 30 to elapse. Block 205 checks to see if suspend flag 34 in control data 30 is FALSE. If this flag is not false (either TRUE or TRUE2 in the preferred embodiment), this is an indication that window timing should be suspended. This condition could exist if the user indicated that she wanted to suspend sampling, or if the inactivity timeout period had expired, as will be discussed in more detail later. If not, flow of control loops back to block 201. If block 205 indicates that suspend is false, block 208 increments timer 32 in control 30 by one to indicate one more timer period has elapsed.

Referring again to FIG. 5A, after block 103 starts the timer, block 110 checks to see if there is a window event to process. In the preferred embodiment, a "window event" is any event generated by Presentation Manager, such as entering data into a window, moving either a text cursor or a mouse cursor, clicking on a scroll bar, etc, as well as events generated by this invention. If block 110 is answered negatively, block 112 checks to see if all windows have been closed. If so, block 198 stops timer 32 and writes control data 30 to storage 14 if save flag 38 is on. The program then ends in block 199. If block 112 indicates that all windows have not been closed, block 115 checks to see if inactivity timeout period 37 in control data 30 has elapsed. This is done by subtracting last event 36 from timer 32, multiplying the result by sampling rate 33, and dividing by 60. If this result is greater than the value in inactivity timeout 37, block 115 is answered affirmatively, and block 118 automatically generates a suspend window event. In either event, flow of control goes back to block 110.

When block 110 indicates that there is a window event to process, block 104 checks to see if this is an open window event. If so, block 105 checks to see if a window having the same name is already in memory 13. If so, this window is given a new name (i.e., Turbo Tax 2) in block 106. In either event, block 107 loads this window in record from storage 14 to memory 13, if any such data was saved from a previous session, and if save flag 38 is on. Normal window processing is then performed in block 108.

Block 121 checks to see if this was a close window event. If so, it is appropriate to remove the window from window data 40 in memory 13 so that it does not reappear when the user selects a window display mode. This function is done by block 122. Block 122 also writes the window record to storage 14 if save flag 38 is on. Block 123 then performs normal window processing for this event.

If block 121 is answered negatively, block 120 asks whether this event is a get focus event. In the preferred embodiment, a "get focus" event is generated by Presentation Manager whenever a window is made active, or put "in focus". If block 120 is answered affirmatively, block 125 registers the window coming into focus. This registration is done by activating the flowchart of FIG. 6.

Figures 2, 2E, 3, 4, 5, 6:
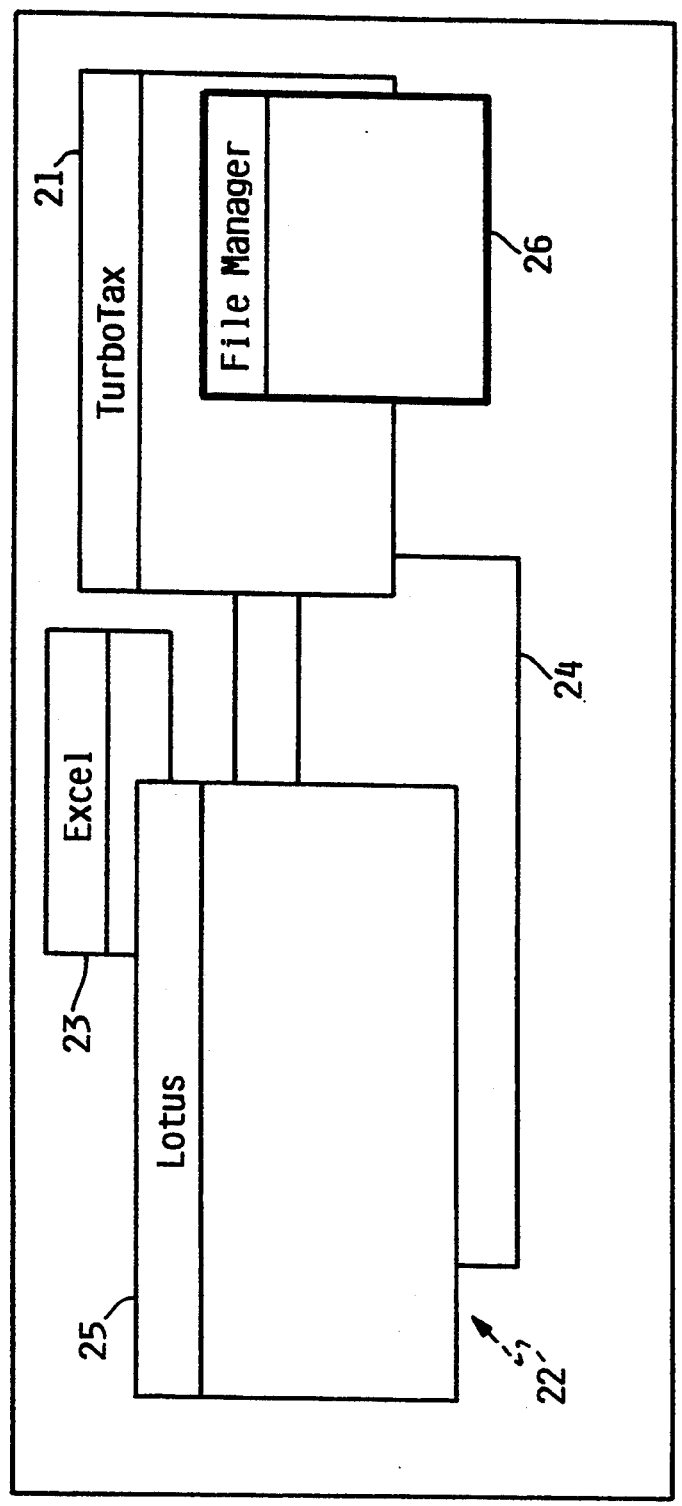

Referring now to FIG. 6, block 301 checks to see if ON/OFF flag 31 in window data 30 is ON. If not, the program ends immediately in block 399. If this flag is ON, block 303 gets the current time from timer 32 in control data 30. Block 304 checks to see whether the window to be put in focus exists in window data 40. If not, block 306 creates a new record for this window in window data 40. Zeros are placed in In focus column 42 and total column 43. If block 304 is answered negatively, block 308 uses the window record associated with this window to be put in focus in window data 40. Block 310 asks whether this is a "get focus" window event or a "lose focus" window event. Since our event is a "get focus" event, block 315 puts the current value of timer 32 from control data 30 into In focus column 42 for this window, and the program ends in block 399.

Referring again to FIG. 5A, after block 125 registers the window coming into focus by activating the flowchart of FIG. 6, block 126 performs the normal window processing for this event. In the preferred embodiment, Presentation Manager puts the selected window in focus.

If block 120 is answered negatively, block 130 asks if this is a lose focus window event. In the preferred embodiment, a "lose focus" event is generated by Presentation Manager whenever a window is no longer active because another window has been put in focus. If block 130 is answered affirmatively, block 135 registers the window losing focus. This registration is done by again activating the flowchart of FIG. 6, as has already been discussed, except that block 310 (FIG. 6) determines that this is a lose focus event, and block 320 is executed instead of block 315. Block 320 updates the value in total column 43 of window data 40 for this window to indicate how long it was active. The value contained in In focus column 42 for this window is subtracted from the current value of timer 32 in control data 30. This result is added to the current value in total column 43 for this window, and the sum is placed in total column 43 for this window.

Referring again to FIG. 5A, after block 135 registers the window losing focus by activating the flowchart of FIG. 6, block 136 performs the normal window processing for this event. In the preferred embodiment, Presentation Manager takes the focus away from the de-selected window.

If block 130 is answered negatively, block 150 (FIG. 5B) checks to see if a suspend window event has been generated. This event could be generated either by block 118 of FIG. 5A (timeout period expired), or if the user indicated that timing should be suspended in her menu in FIG. 4. If the event was generated by the user, block 151 sets suspend flag 34 in control data 30 to be TRUE. If the event was generated by block 118, block 151 sets suspend flag 34 in control data 30 to be TRUE2. In either case, this will result in block 205 of independently executing flowchart FIG. 7 to be answered negatively, thereby skipping block 208.

Referring again to FIG. 5B, If block 150 is answered negatively, block 155 checks to see if a resume window event has been generated. This event could be generated either by block 1050 of FIG. 10 (timeout period expired, but user has now performed an action that caused a window event, or if the user indicated that timing should be resumed in her menu in FIG. 4. In either case, block 156 sets suspend flag 34 in control data 30 to be FALSE. This will result in block 205 of independently executing flowchart FIG. 7 to be answered affirmatively, thereby executing block 208.

Referring again to FIG. 5B, if block 155 is answered negatively, block 160 checks to see if a reset window event has been generated. This event is generated if the user indicated that timing should be reset in her menu in FIG. 4. Block 161 loops through all the windows in window data 40, and block 162 sets all the values of In focus column 42 and total column 43 to zero. When there are no more window records in window data 40 to process, block 161 is answered negatively, and flow of control moves to block 163.

Block 163 checks to see if a save window event has been generated. This event is generated if the user changed the value for the save parameter in her menu in FIG. 4. If a change was made, block 104 sets save flag 38 in control data 30 to be either ON or OFF, as specified by the user.

Block 165 checks to see if a turn window timing off event has been generated. This event is generated if the user indicated that window timing should be turned off in her menu in FIG. 4. If so, block 166 sets ON/OFF flag 31 in control data 30 to be OFF. Block 168 loops through all the windows in window data 40, and block 169 sets all the values of In focus column 42 and total column 43 to zero. When there are no more window records in window data 40 to process, block 168 is answered negatively, and flow of control moves to block 170.

Block 170 checks to see if a turn window timing on event has been generated. This event is generated if the user indicated that window timing should be turned on in her menu in FIG. 4. If so, block 171 sets ON/OFF flag 31 in control data 30 to be ON. In either event, flow of control moves to block 175.

Block 175 checks to see if a set sampling rate window event has been generated. This event is generated if the user filled in a value for the sampling rate in her menu in FIG. 4. If so, block 176 sets sampling rate field 33 in control data 30 to the value set by the user.

Block 195 checks to see if there is another window event to process. If so, block 196 performs conventional window processing for this event. In either event, flow of control loops back to block 115 of FIG. 5A.

Figures 1, 5A:
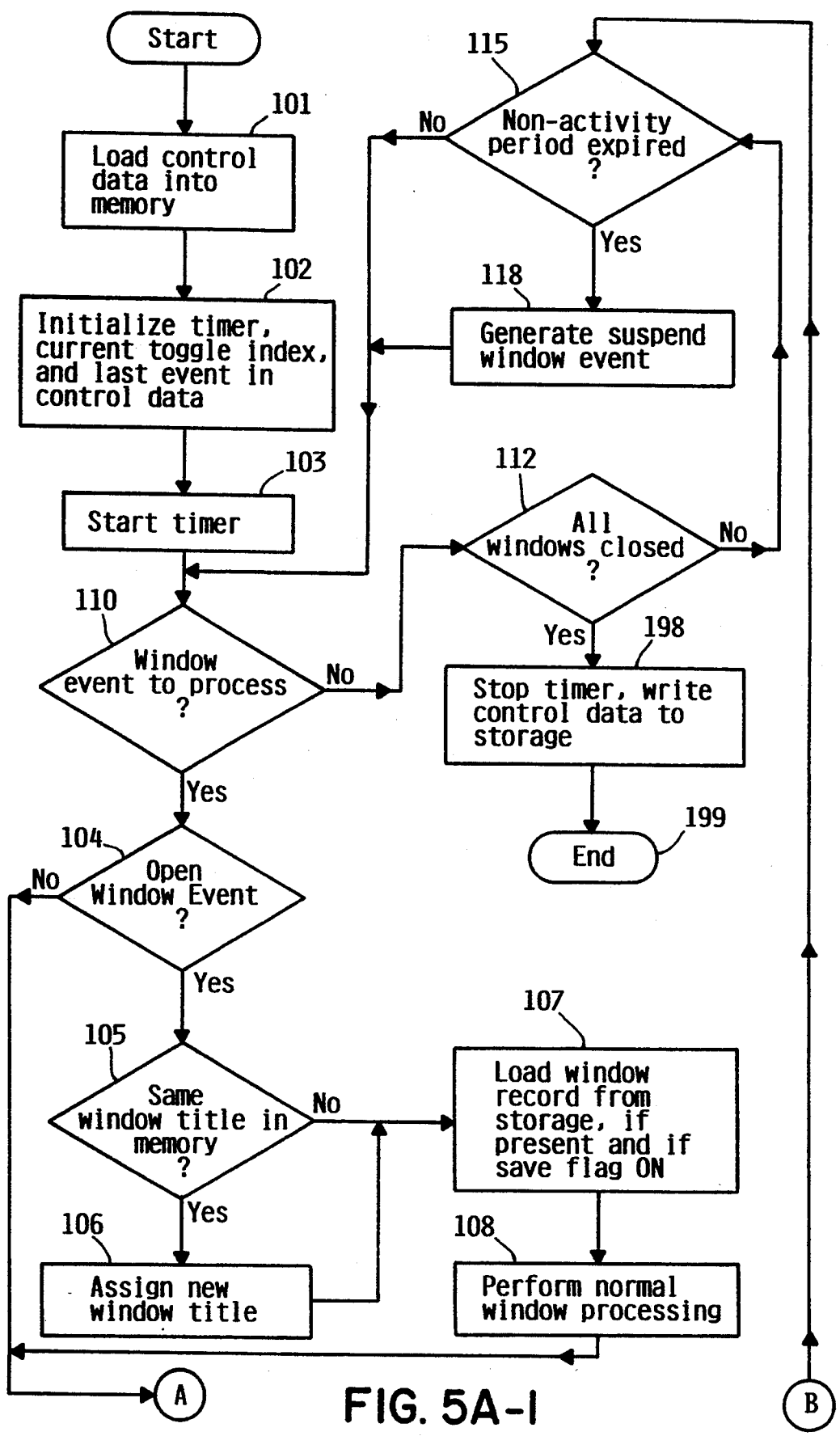
Figs. 5A(1-2),5B-5C, 6-8, 9A-9D and 10 show the flowcharts of the invention.
Figures 2, 5A:
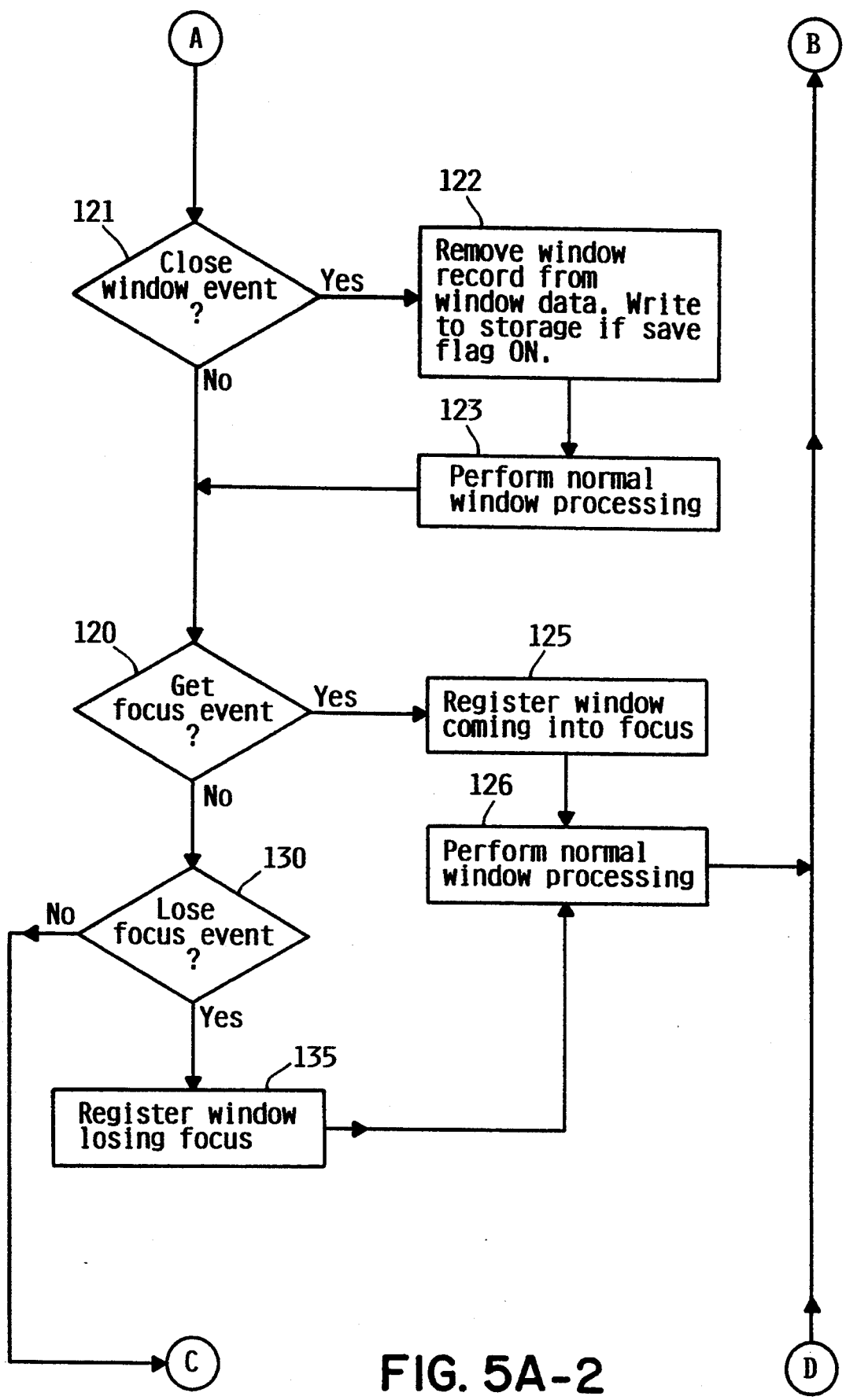
Figure 5B:
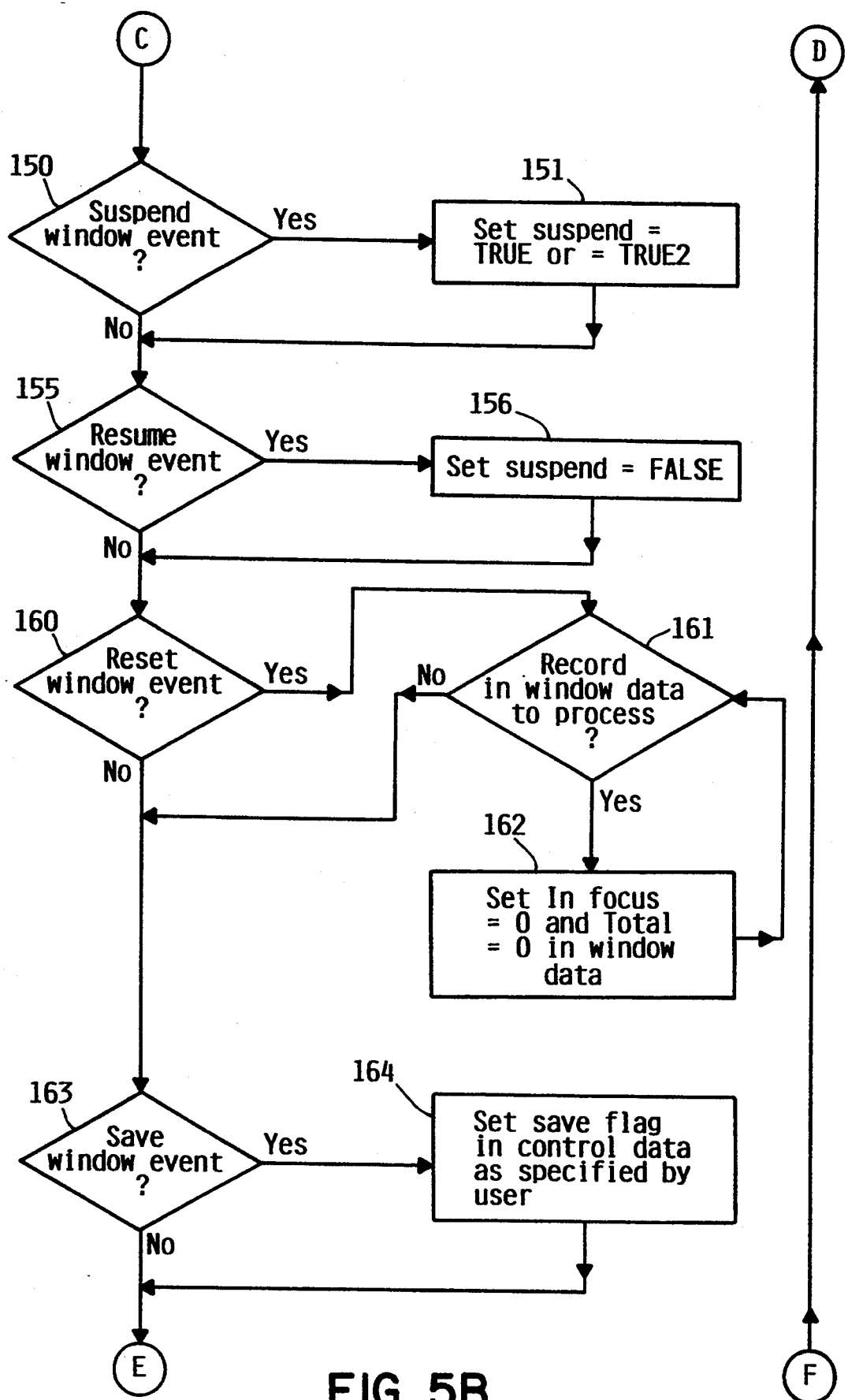
Figure 5C:
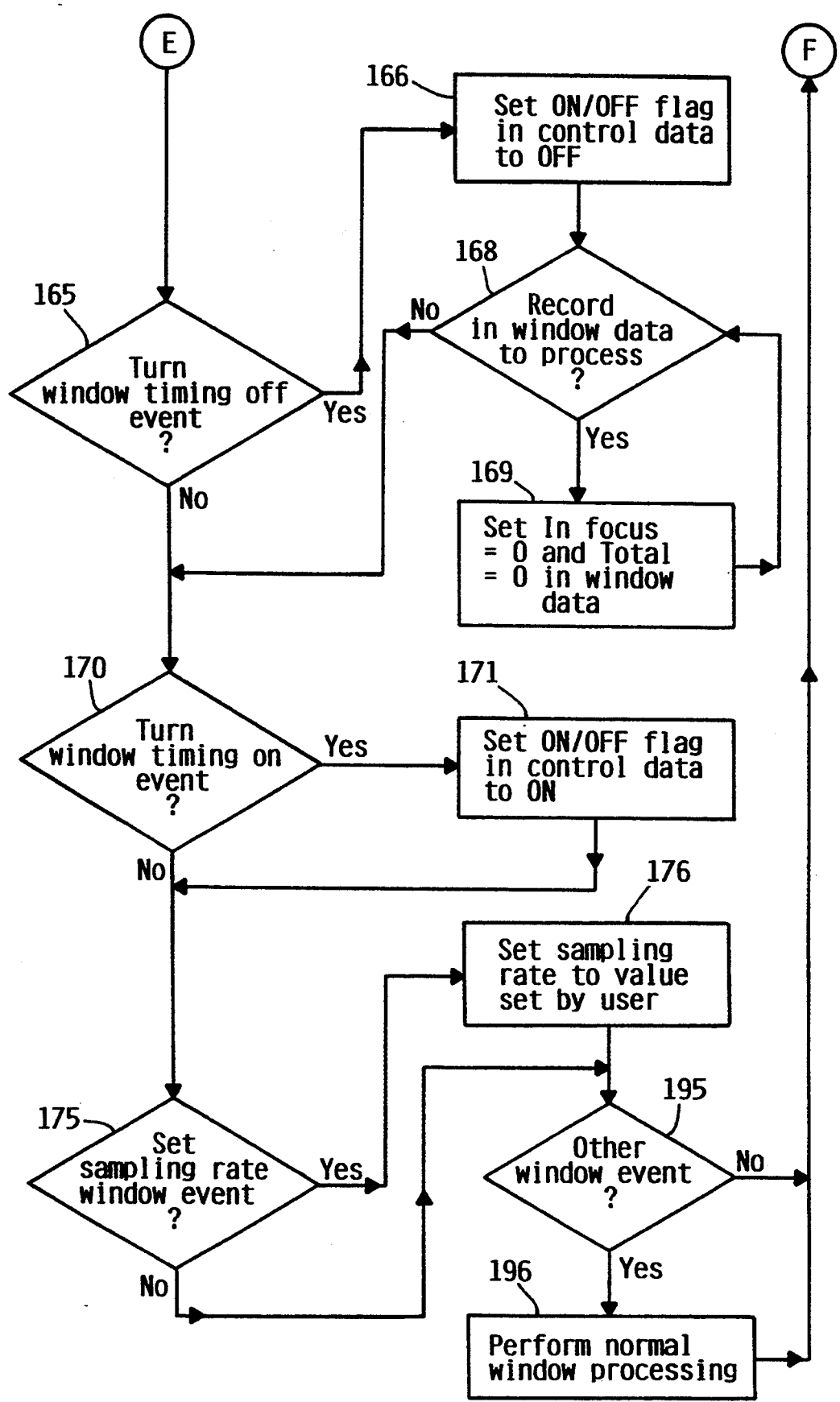
Figure 6:
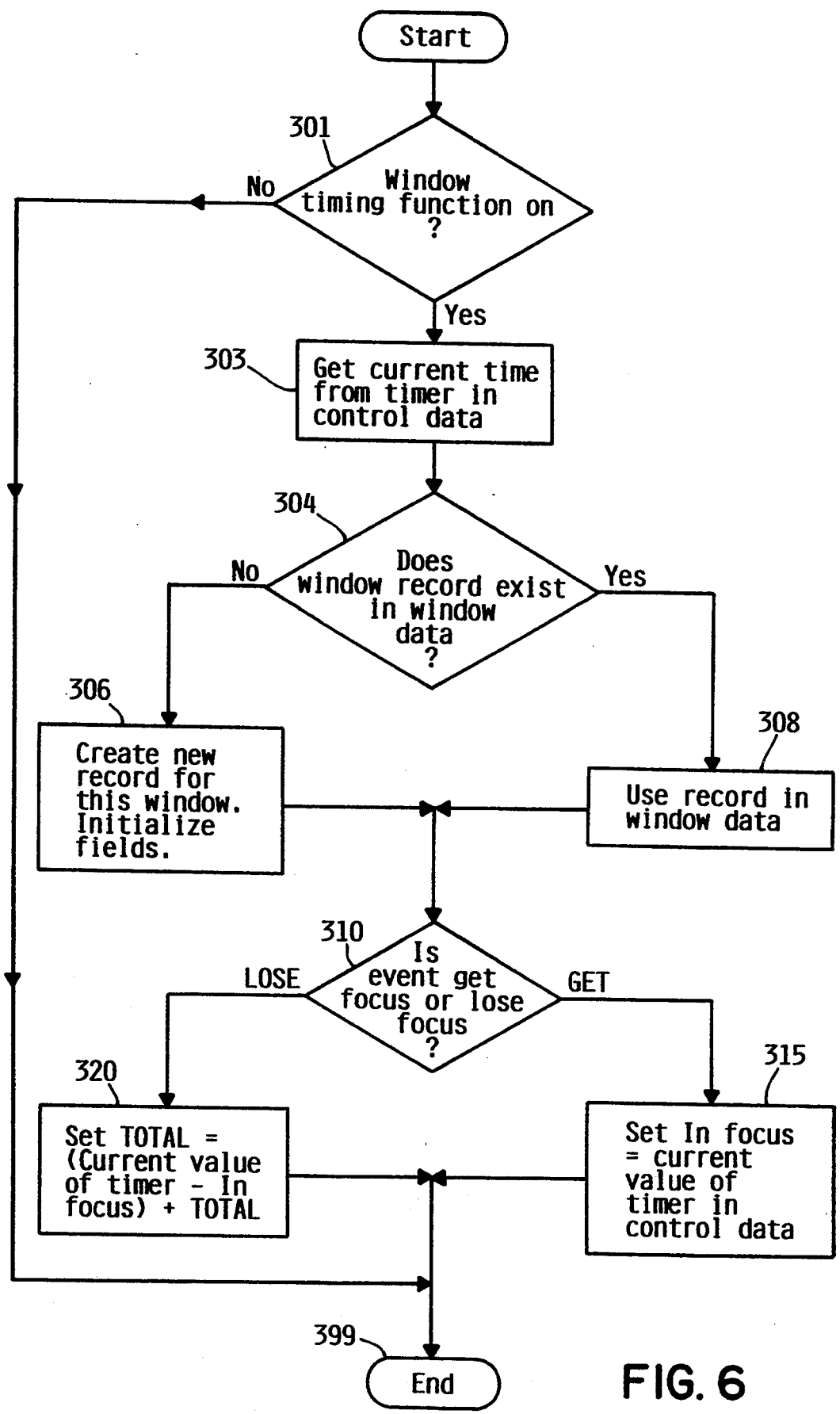
Figure 8:
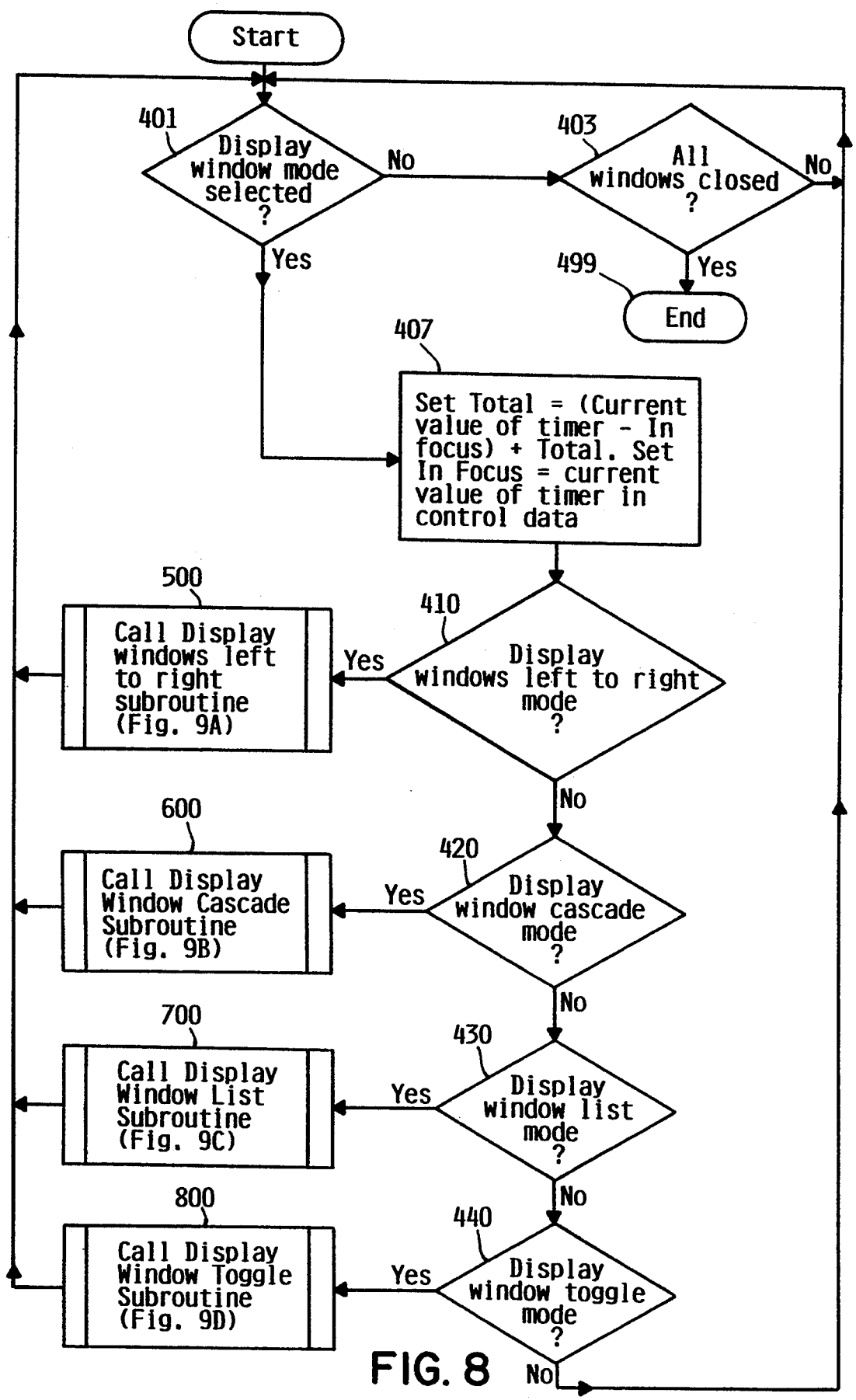

While the flowcharts of FIGS. 5A–5B and FIG. 7 are independently executing, the flowchart of FIG. 8 is also independently executing inside processor 12. This flowchart monitors user input to see if the user wants to rearrange her windows using the window timing function of this invention, as shown in FIGS. 2B–2E. Referring now to FIG. 8, block 401 checks to see if the user has selected a display window mode. In the preferred embodiment, the user can select one of four display window modes: right to left mode (as shown in FIG. 2B), cascade mode (as shown in FIG. 2C), window list mode (as shown in FIG. 2D), and toggle mode (as shown in FIGS. 2E-1 to 2E-6). If block 401 determines that a display window mode has not been selected, block 403 checks to see if all windows have been closed. If so, the program ends in block 499. If not, the program loops back to block 401 to again check to see if a display window mode has been selected. In the preferred embodiment, window display modes are selected through a specified key sequence. For example, ALT-R may be used for left to right mode, ALT-C may be used for cascade mode, ALT-L may be used for window list mode, and ALT-T may be used for toggle mode. Alternatively, a combination of mouse buttons could be used, or the user could select the mode from a menu or by clicking on an icon or representation of a button on the display screen. In any event, as soon as block 401 determines that a window display mode has been selected, block 407 sets Total column 43 for the window currently in focus equal to the current value of timer 32 minus the value in the focus column 42, and adds this result to the value currently in Total column 43. This function is the same as is performed by block 320 of FIG. 6, and assures that the most up to date information about the window currently in focus is used. Block 407 also sets in focus column 42 for this window equal to the current value of timer 32.

Block 410 checks to see if the selected mode was the left to right mode. If so, block 500 calls the Display Windows Left to Right Subroutine of FIG. 9A.

Figure 9A:
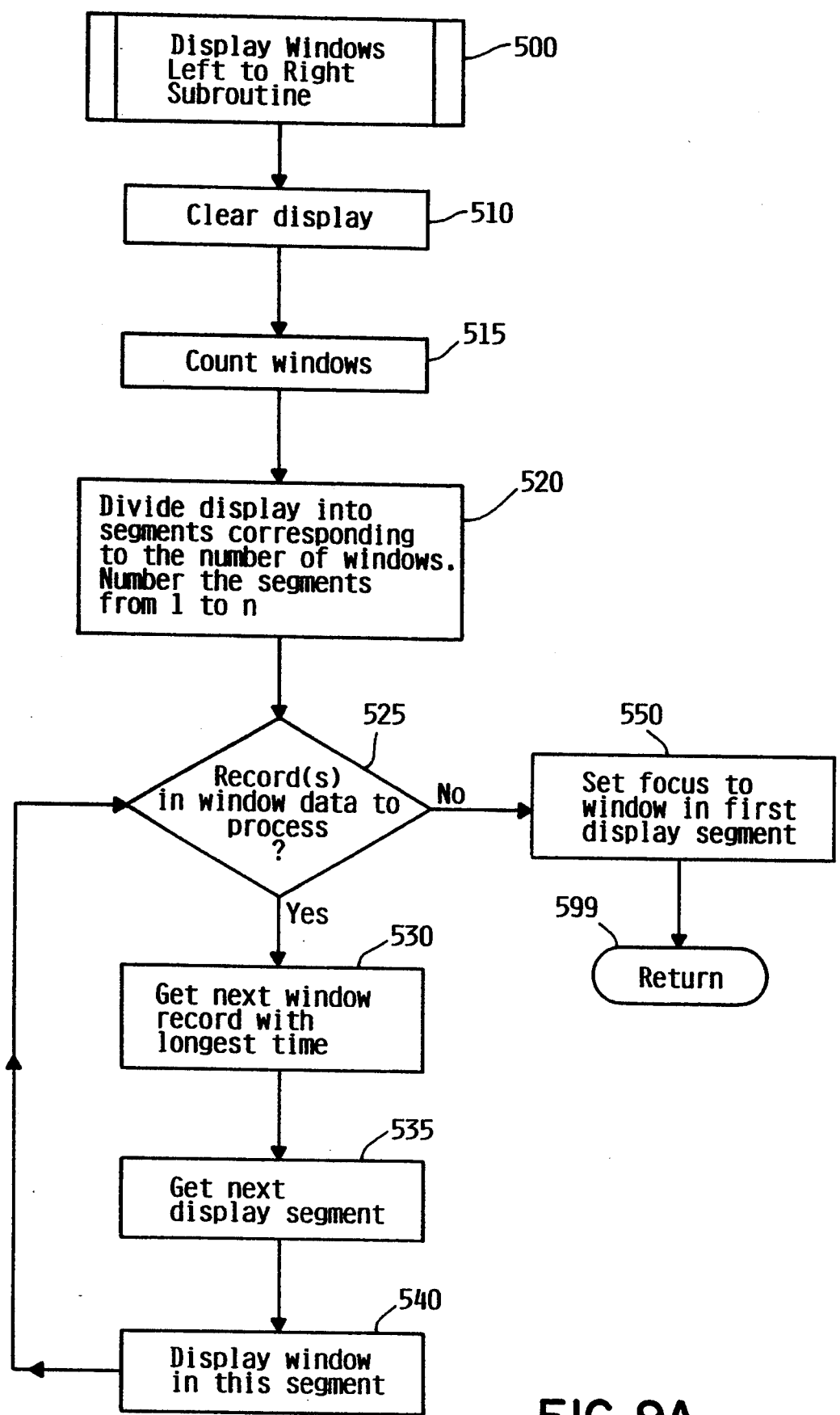

Referring now to FIG. 9A, block 510 clears the display of all data in a conventional manner. Block 515 counts the number of windows contained in window data 40. Block 520 divides the display into segments corresponding to the number of windows, and numbers the segments from 1 to N. For example, if there are six windows in window data 40, block 520 would divide the display into six segments, as is shown in FIG. 2B. In the preferred embodiment, the segments are numbered 1 to N starting in the upper left corner of the screen and moving left to right. When one row of windows has been displayed, the next segment is located down one row and again starts at the left. The last segment is located in the lower right corner of the screen.

Block 525 checks to see if there are any records in window data left to process. If 50, block 530 checks Total column 43 in window data 40 for the unprocessed record with the longest time. When this is found, block 535 gets the next available display segment. Block 540 displays the window determined by block 530 into the segment determined by block 535. Flow of control then loops back to block 525 to process the remaining records in window data 40 in a similar manner. When block 525 determines that all records in window data have been processed, block 550 puts the window in the first display segment in focus. The subroutine returns in block 599 to block 401 of FIG. 8.

Figure 9B:
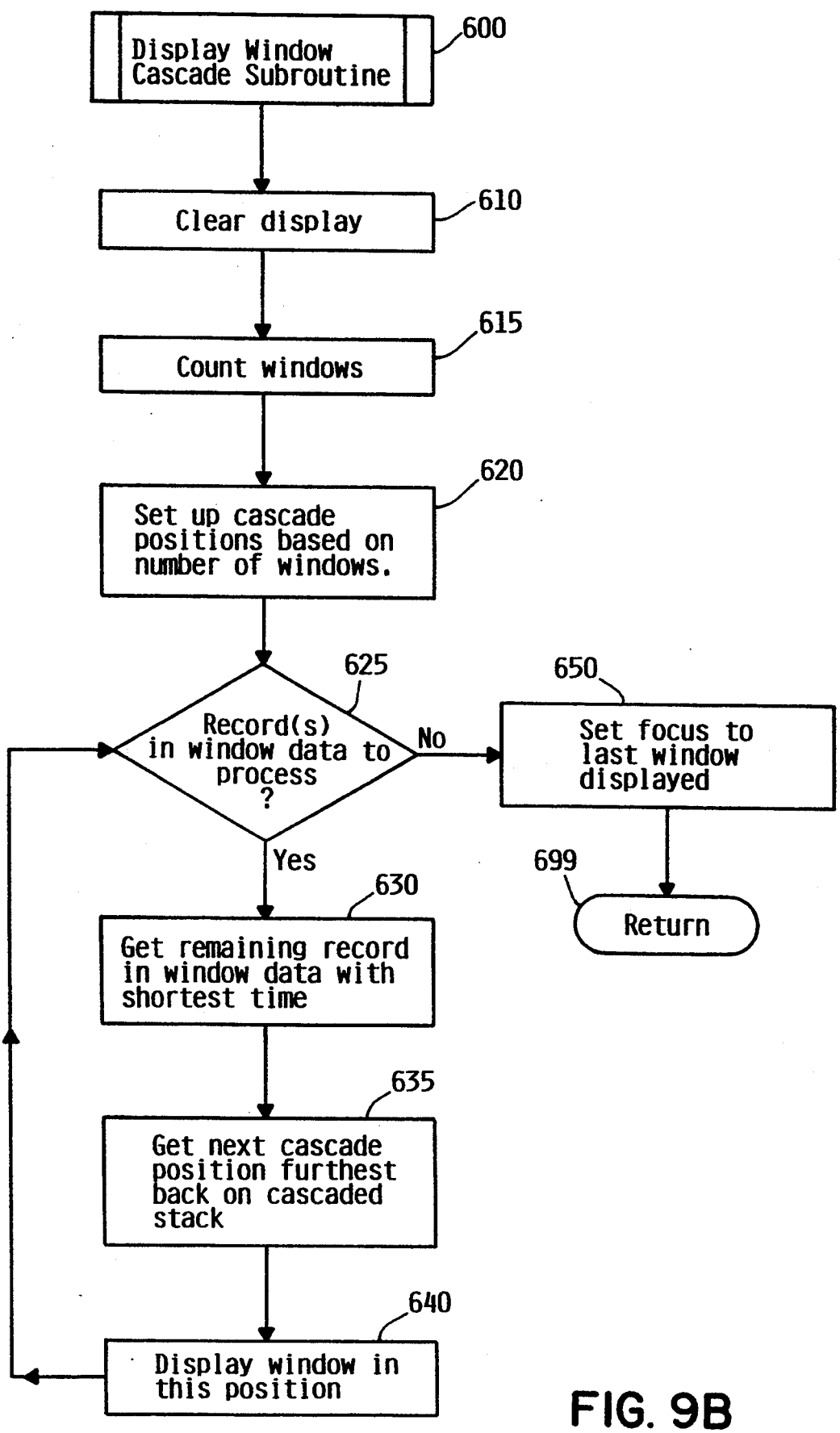

Referring again to FIG. 8, if block 410 is answered negatively, block 420 checks to see if display window cascade mode has been selected. If so, block 600 calls the Display Window Cascade subroutine of FIG. 9B. Referring now to FIG. 9B, block 610 clears the display of all data in a conventional manner. Block 615 counts the number of windows contained in window data 40. Block 620 sets up cascade positions based on the number of windows in window data 40. In the preferred embodiment, this step is performed using commonly known capabilities of Presentation Manager. For example, if there are six windows in window data 40, block 620 would set up six cascade positions, as is shown in FIG. 2C.

Block 625 checks to see if there are any records in window data left to process. If so, block 630 checks Total column 43 in window data 40 for the unprocessed record with the shortest time. When this is found, block 635 gets the next available cascade position furthest back on the cascaded stack. Block 640 displays the window determined by block 630 into the segment determined by block 635. For all cascade positions except the one at the top of the stack, only the title and a small portion of the window is displayed—the rest of the window is obscured by the other windows higher up on the stack. This is shown in FIG. 2C Flow of control then loops back to block 625 to process the remaining records in window data 40 in a similar manner. When block 625 determines that all records in window data 40 have been processed, block 650 puts the window at the top of the cascade stack in focus. The subroutine returns in block 699 to block 401 of FIG. 8.

Figure 9C:
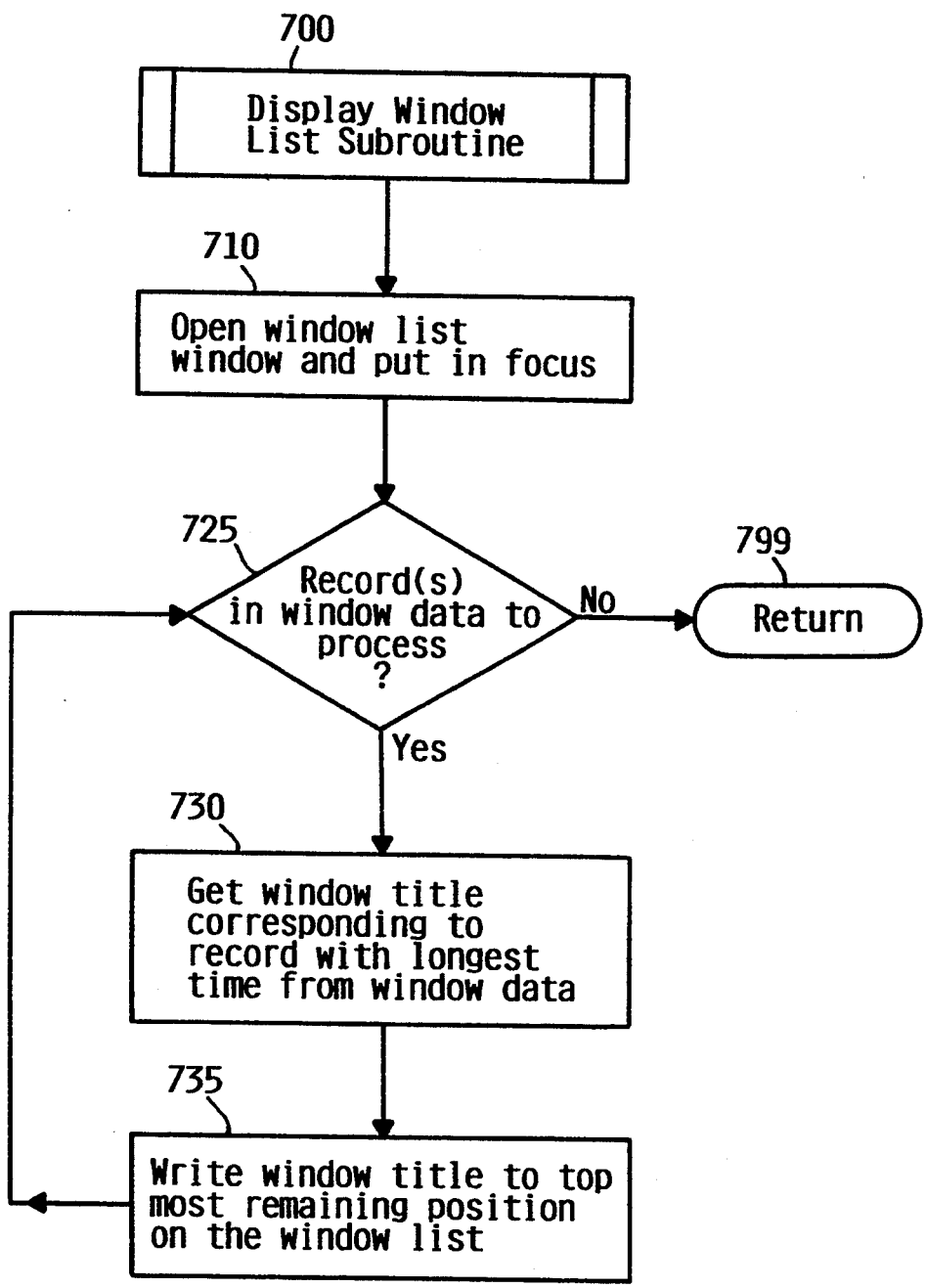

Referring again to FIG. 8, if block 420 is answered negatively, block 430 checks to see if display window list mode has been selected. If so, block 700 calls the Display Window List subroutine of FIG. 9C. Referring now to FIG. 9C, block 710 opens a new window for the window list, and puts it in focus, as is shown in FIG. 2D. Block 725 checks to see if there are any records in window data left to process. If so, block 730 checks Total column 43 in window data 40 for the unprocessed record with the longest time. When this is found, block 735 writes the window title (found in column 41 of window data 40) for this window at the top most remaining position on the window list. Flow of control then loops back to block 725 to process the remaining records in window data 40 in a similar manner. When block 725 determines that all records in window data 40 have been processed, the subroutine returns in block 799 to block 401 of FIG. 8.

Figure 9D:
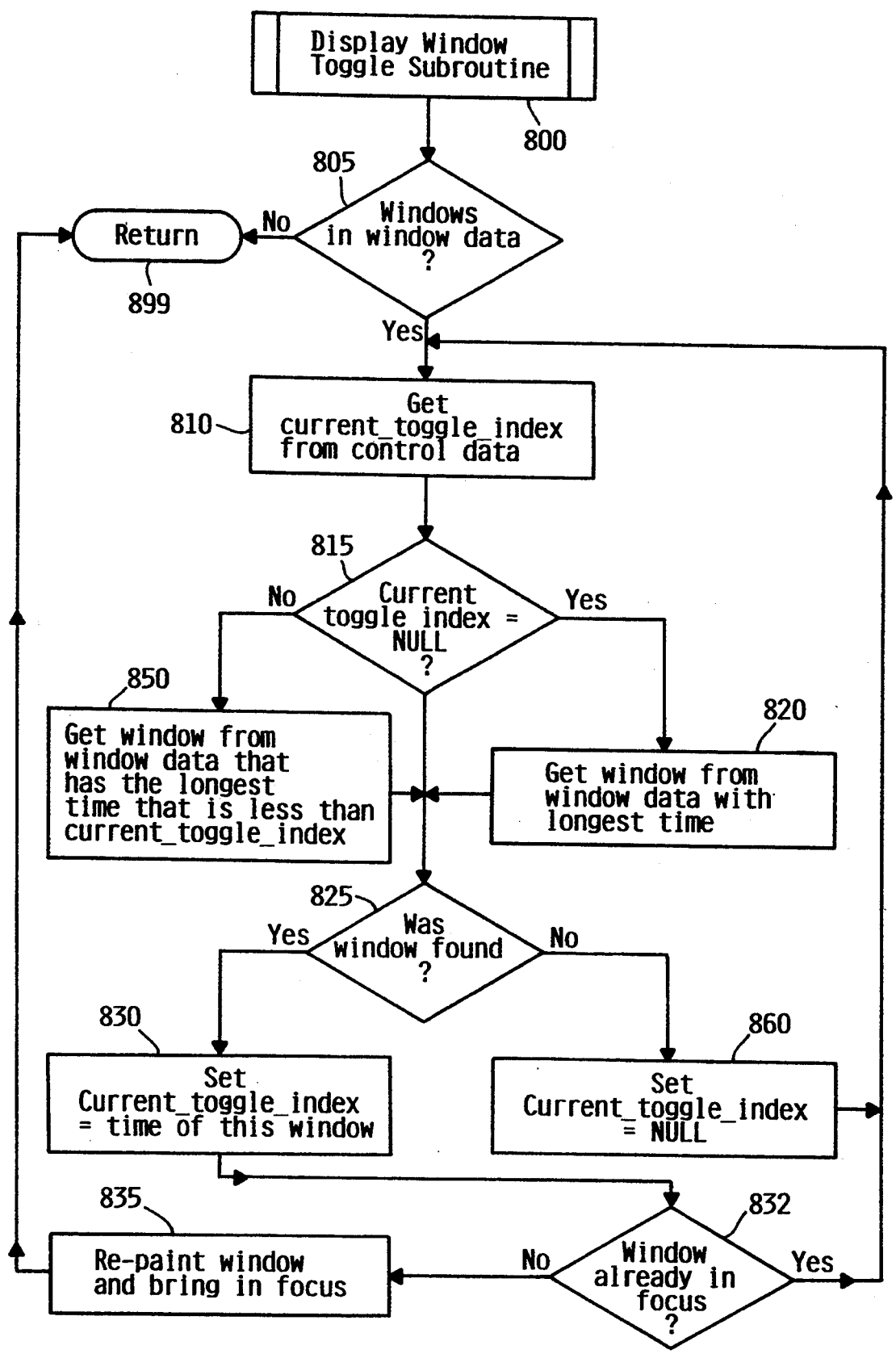

Referring again to FIG. 8, if block 430 is answered negatively, block 440 checks to see if display window toggle mode has been selected. If so, block 800 calls the Display Window Toggle subroutine of FIG. 9D. Referring now to FIG. 9D, block 805 checks to see if there are any windows in window data 40. If not, the subroutine returns in block 899. If so, block 810 gets current toggle index flag 35 from control data 30. This flag keeps track of which window to display next when the toggle key sequence is pressed. Block 815 checks to see if current toggle index=NULL. Block 815 will be answered affirmatively the first time the toggle key sequence is pressed after other events have occurred, as will be described in more detail later in the flowchart of FIG. 10. If current toggle index=NULL, block 820 gets the window with the longest time in Total column 43. Block 825 then asks if a window was found in block 820. Since a window was found, block 830 sets the value of current toggle index flag 36 in control data 30 equal to the time in Total column 43 for this window in window data 40. This is done so that this window is skipped if the user presses another toggle key sequence without performing any other intervening event. Block 832 checks to see if the selected window is already in focus. If so, flow of control moves back to block 810 to select the next windows If not, block 835 re-paints the window and brings it into focus. This is shown in FIG. 2E-1. The subroutine returns in block 899 to block 401 of FIG. 8.

If the user presses another toggle key sequence, block 440 is again answered affirmatively, and subroutine 800 is again called. This time, block 815 is answered negatively, since control toggle index was set in block 830 to be the time of the first window. Therefore, block 850 gets the next window from window data 40—i.e., the window that has the longest time in Total column 43 that is smaller than current toggle index flag 36. Flow of control loops through blocks 825, 830, 835, and 899, as before. This is shown in FIG. 2E-2.

If the user continues to press toggle key sequences without any other intervening event, blocks 805, 810, 815, 850, 825, 830, 832, 835, and 899 continue to be executed until the last window has been re-painted and put in focus by block 835. This is shown in FIGS. 2E-3 to 2E-6. If the toggle key sequence is pressed again, after the last window has been re-painted, block 825 is answered negatively, since no window could be found that has a time shorter than current toggle index. Therefore, block 860 sets current toggle index=NULL, and loops back to block 810. This will start the toggle sequence over again, so that the window with the longest time in Total column 43 will again be re-painted and put in focus.

If the user does something other than a toggle key sequence (such as enter data into a window or perform a scrolling operation) it is desirable to begin the toggle sequence over again, starting with the most active window. This is one function of the flowchart of FIG. 10, which independently executes in processor 12 along with the flowcharts of Figs. 5A-5B, FIG. 7, and FIG. 8.

Figure 10:
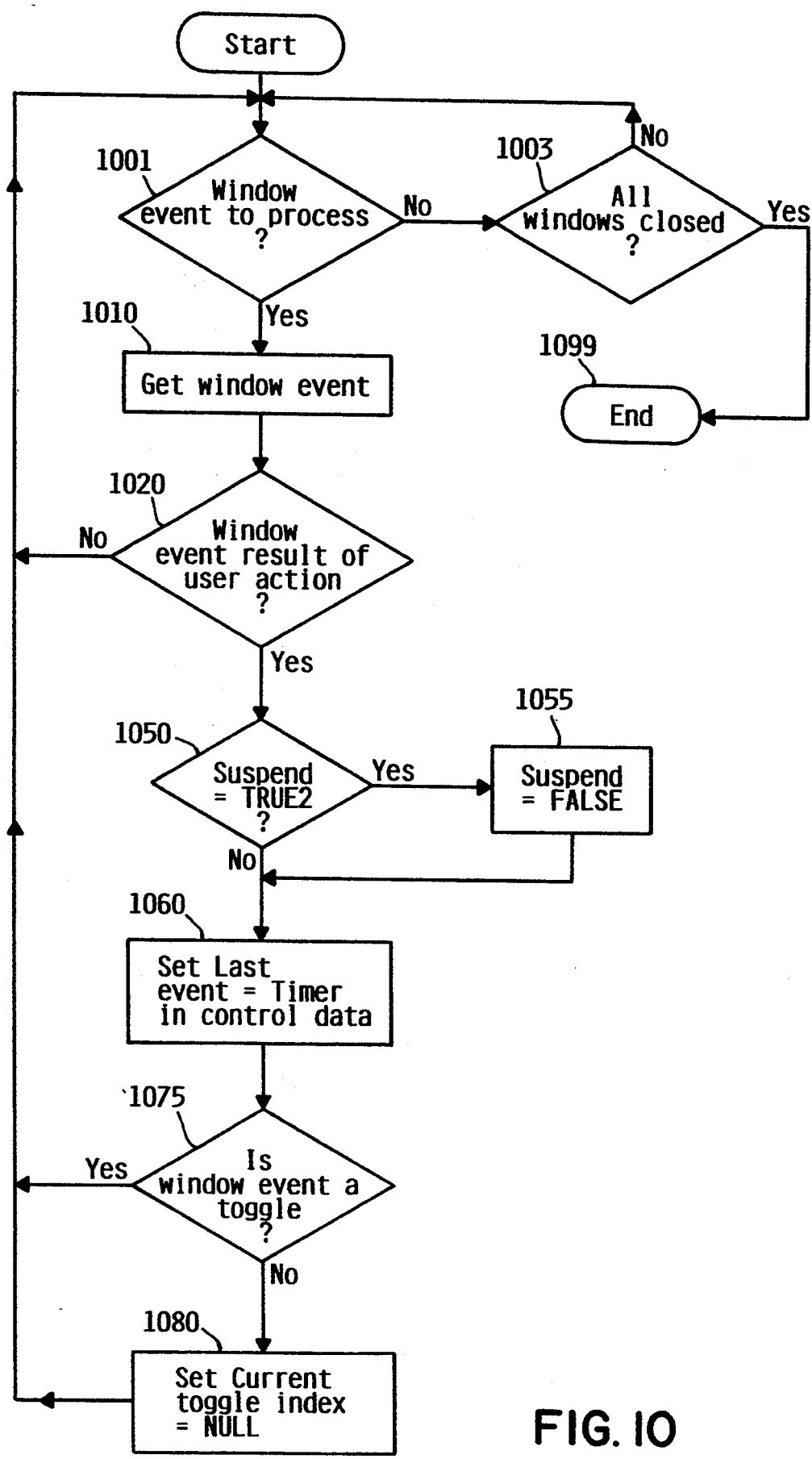

Referring now to FIG. 10, block 1001 checks to see if there is a window event to process. This is the same check that is done by block 110 of FIG. 5A. If block 1001 determines that there isn't a window event to process, block 1003 checks to see if all windows have been closed. If so, the program ends in block 1099. If not, the program loops back to block 1001 to again check to see if there is a window event to process. Once block 1001 is answered affirmatively, block 1010 gets the window event. Block 1020 asks if this window event is the result of a user action. If not, the program loops back to block 1001 to look for another window event to process. Note that FIGS. 5A-5B actually performs the event—FIG. 10 just looks for specific events that impact the window timing function of the invention. If block 1020 is answered affirmatively, block 1050 checks to see if suspend flag 34 of control data 30 is equal to TRUE2. If this flag is equal to TRUE2, the window timing function was suspended due to an inactivity timeout. Since the user has now done something, it is appropriate to restart the window timing function. This is done in block 1055 by changing the value of suspend flag 34 to FALSE, so that block 205 of FIG. 7 can be answered affirmatively and timer flag 32 in window data 30 can be incremented by block 208.

Referring again to FIG. 10, regardless of how block 1050 is answered, flow of control moves to block 1060, where last event flag 36 is set to be the value of timer 32 in control data 30. Last event flag 36 therefore contains the last time an event occurred that indicated user activity with one of the windows on the display screen. This information is used by blocks 115 and 118 of FIG. 5A to check to see if the specified inactivity timeout has been exceeded.

Block 1075 (FIG. 10) asks whether the window event is a toggle. If not, current toggle index flag 35 is reset to NULL in block 1080. This will result in the most active window being displayed the next time the toggle key sequence is pressed, as has been discussed. If block 1075 is answered affirmatively, the user has pressed the toggle key sequence more than once in succession without any intervening non-toggle events. Therefore, block 1080 is skipped. In either event, the program loops back to block 1001.

While this invention has been described with respect to the preferred embodiment and several alternate embodiments, it will be understood by those skilled in the art that various changes in detail may be made therein without departing from the spirit, scope and teaching of the invention. For example, the left to right window display mode described in FIG. 9A can be easily modified to be a right to left/top to bottom display mode, or a top to bottom/left to right display mode, or a right to left/top to bottom display mode by simply changing how the display segments are numbered in block 520 of FIG. 9A. Therefore, cultural or personal differences in what would be considered to be the most distinctive display position for the most active window can be taken into account. Accordingly, the herein disclosed is to be limited only as specified in the following claims.

What is claimed is:

1. A method for efficiently displaying a plurality of windows on a display screen, comprising the steps of:
   monitoring a length of time that each of said plurality of windows has been active; and
   displaying each of said plurality of windows at a location within said display screen such that at least one window active a longer length of time is displayed more distinctively than a window active a shorter length of time.

2. The method of claim 1, wherein said displaying step further comprises the steps of:
   placing a first window active a longest length of time in the upper left corner of the display screen; and
   placing the rest of said plurality of windows on said display screen from left to right and top to bottom in descending order of activity.

3. The method of claim 2, further comprising the step of:
   indicating that said first window is in focus.

4. The method of claim 1, wherein said displaying step further comprises the steps of:
   placing a first window active a longest length of time in the upper right corner of the display screen; and placing the rest of said plurality of windows on said display screen from right to left and top to bottom in descending order of activity.

5. The method of claim 4, further comprising the step of:

indicating that said first window is in focus.

6. The method of claim 1, wherein said displaying step further comprises the steps of:

placing a first window active a longest length of time in the upper left corner of the display screen; and placing the rest of said plurality of windows on said display screen from top to bottom and left to right in descending order of activity.

7. The method of claim 6, further comprising the step of:

indicating that said first window is in focus.

8. The method of claim 1, wherein said displaying step further comprises the steps of:

placing a first window active a longest length of time in the upper right corner of the display screen; and placing the rest of said plurality of windows on said display screen from top to bottom and right to left in descending order of activity.

9. The method of claim 8, further comprising the step of:

indicating that said first window is in focus.

10. The method of claim 1, wherein said displaying step further comprises the steps of:

placing a first window active a longest length of time at the top of a window cascade stack on said display screen; and placing the rest of said plurality of windows on said display screen behind said first window in said window cascade stack in descending order of activity.

11. The method of claim 10, further comprising the step of:

indicating that said first window is in focus.

12. The method of claim 1, wherein said plurality of windows has a plurality of window titles associated therewith and wherein said displaying step further comprises the steps of:

placing a first title associated with a first window active a longest length of time at the top of a window list on said display screen; and placing the rest of said plurality of window titles associated with the rest of said plurality of windows on said display screen after said first window on said window list in descending order of activity.

13. The method of claim 1, wherein said displaying step further comprises the step of:

indicating that a first window active a longest length of time is in focus.

14. The method of claim 13, further comprising the steps of:

receiving a plurality of toggle commands and sequentially indicating that the rest of said plurality of windows are in focus in descending order of activity as each of said plurality of toggle commands are received.

15. The method of claim 14, further comprising the steps of:

determining that a window active the shortest length of time has been placed in focus by said sequentially indicating step; and re-indicating that said first window is in focus as the next of said plurality of toggle commands is received.

16. A computer system for efficiently displaying a plurality of windows comprising:

a system unit further comprising:
a processor;
memory, connected to said processor;
storage, connected to said processor;
a display adapter connected to said processor;
a display, connected to said system unit;

means in said processor for monitoring a length of time that each of said plurality of windows has been active; and means in said processor for displaying each of said plurality of windows at a location on said display such that at least one window active a longer length of time is displayed more distinctively than a window active a shorter length of time.

17. A method for efficiently displaying a plurality of windows on a display screen, comprising the steps of:

monitoring a length of time that each of said plurality of windows has been active;

determining that a first window of said plurality of windows has been active a longer length of time than the rest of said plurality of windows;

displaying said first window more distinctively than the rest of said plurality of windows;

determining that a second window of said plurality of windows has been active a shorter length of time than said first window but a longer length of time than the rest of said plurality of windows; and displaying said second window less distinctively than said first window but more distinctively than the rest of said plurality of windows.

18. The method of claim 17, wherein said step of displaying said first window more distinctively than the rest of said plurality of windows further comprises the step of:

indicating that said first window is in focus.

19. A method for efficiently displaying a plurality of windows on a display screen, comprising the steps of:

monitoring a length of time that each of said plurality of windows has been active;

displaying said plurality of windows such that at least one window active a longer length of time is displayed more distinctively than a window active a shorter length of time and is indicated as in focus;

receiving a plurality of toggle commands; and sequentially indicating that the rest of said plurality of windows are in focus in descending order of activity as each of said plurality of toggle commands are received.

20. The method of claim 19, further comprising the steps of:

determining that a window active the shortest length of time has been placed in focus by said sequentially indicating steps; and re-indicating that said first window is in focus as the next of said plurality of toggle commands is received.

* * * * *